United States Patent
Lin et al.

(10) Patent No.: US 10,659,780 B2
(45) Date of Patent: May 19, 2020

(54) DE-BLOCKING METHOD FOR RECONSTRUCTED PROJECTION-BASED FRAME THAT EMPLOYS PROJECTION LAYOUT OF 360-DEGREE VIRTUAL REALITY PROJECTION

(71) Applicant: MEDIATEK INC., Hsin-Chu (TW)

(72) Inventors: Sheng-Yen Lin, Hsin-Chu (TW); Jian-Liang Lin, Hsin-Chu (TW); Cheng-Hsuan Shih, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/296,231

(22) Filed: Mar. 8, 2019

(65) Prior Publication Data

US 2019/0281293 A1     Sep. 12, 2019

Related U.S. Application Data

(60) Provisional application No. 62/640,699, filed on Mar. 9, 2018, provisional application No. 62/723,522, filed on Aug. 28, 2018.

(51) Int. Cl.
*H04N 13/00* (2018.01)
*H04N 19/46* (2014.01)
(Continued)

(52) U.S. Cl.
CPC ........... *H04N 19/117* (2014.11); *H04N 19/14* (2014.11); *H04N 19/182* (2014.11); *H04N 19/52* (2014.11)

(58) Field of Classification Search
CPC .... H04N 19/117; H04N 19/14; H04N 19/182; H04N 19/52
(Continued)

(56) References Cited

U.S. PATENT DOCUMENTS

2015/0341552 A1    11/2015   Chen
2018/0054613 A1*    2/2018   Lin .................... H04N 19/597
2018/0192074 A1*    7/2018   Shih ................... H04N 19/105

FOREIGN PATENT DOCUMENTS

CN       103503456 A      1/2014
CN       104113765 A     10/2014
(Continued)

OTHER PUBLICATIONS

"International Search Report" dated May 22, 2019 for International application No. PCT/CN2019/077543, International filing date: Mar. 8, 2019.

*Primary Examiner* — Hee-Yong Kim
(74) *Attorney, Agent, or Firm* — Winston Hsu

(57) ABSTRACT

A de-blocking method is applied to a reconstructed projection-based frame having a first projection face and a second projection face, and includes obtaining a first spherical neighboring block for a first block with a block edge to be de-blocking filtered, and selectively applying de-blocking to the block edge of the first block for at least updating a portion of pixels of the first block. There is image content discontinuity between a face boundary of the first projection face and a face boundary of the second projection face. The first block is a part of the first projection face, and the block edge of the first block is a part of the face boundary of the first projection face. A region on a sphere to which the first spherical neighboring block corresponds is adjacent to a region on the sphere from which the first projection face is obtained.

26 Claims, 18 Drawing Sheets

(51) Int. Cl.
    *H04N 19/167*     (2014.01)
    *H04N 19/86*     (2014.01)
    *H04N 19/117*     (2014.01)
    *H04N 19/52*     (2014.01)
    *H04N 19/182*     (2014.01)
    *H04N 19/14*     (2014.01)

(58) Field of Classification Search
    USPC .................................................. 375/240.29
    See application file for complete search history.

(56) References Cited

FOREIGN PATENT DOCUMENTS

| | | | |
|---|---|---|---|
| TW | 201813380 | A | 4/2018 |
| TW | 201813383 | A | 4/2018 |
| WO | 2018/010688 | A1 | 1/2018 |
| WO | 2018/036447 | A1 | 3/2018 |

* cited by examiner

DE-BLOCKING METHOD FOR RECONSTRUCTED PROJECTION-BASED FRAME THAT EMPLOYS PROJECTION LAYOUT OF 360-DEGREE VIRTUAL REALITY PROJECTION

CROSS REFERENCE TO RELATED APPLICATIONS

This application claims the benefit of U.S. provisional application No. 62/640,699 filed Mar. 9, 2018 and U.S. provisional application No. 62/723,522 filed Aug. 28, 2018. The entire contents of the related applications, including U.S. provisional application No. 62/640,699 and U.S. provisional application No. 62/723,522, are incorporated herein by reference.

BACKGROUND

The present invention relates to processing omnidirectional video content, and more particularly, to a de-blocking method for a reconstructed projection-based frame that employs a projection layout of a 360-degree virtual reality (360 VR) projection.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image content corresponding to a sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

Data compression/encoding of the omnidirectional video may be achieved by a conventional video coding standard that generally adopt a block-based coding technique to exploit spatial and temporal redundancy. For example, the basic approach is to divide a source frame into a plurality of blocks (or coding units), perform intra prediction/inter prediction on each block, transform residues of each block, and perform quantization and entropy encoding. Besides, a reconstructed frame is generated to provide reference pixel data used for coding following blocks. For certain video coding standards, in-loop filter(s) may be used for enhancing the image quality of the reconstructed frame. For example, a de-blocking filter is used by a video encoder to reduce the blocky artifacts which appear after block-based coding. A video decoder is used to perform an inverse operation of a video encoding operation performed by the video encoder. Hence, the video decoder also has in-loop filter (s) used for enhancing the image quality of the reconstructed frame. For example, a de-blocking filter is also used by the video decoder to reduce the blocky artifacts.

In general, the omnidirectional video content corresponding to the sphere is transformed into a sequence of images, each of which is a projection-based frame with a 360-degree image content represented by one or more projection faces arranged in a 360-degree Virtual Reality (360 VR) projection layout, and then the sequence of the projection-based frames is encoded into a bitstream for transmission. However, the projection-based frame may have image content discontinuity at picture boundaries (i.e., layout boundaries) and/or face edges (i.e., face boundaries). A conventional de-blocking filter design, however, is unable to deal with de-blocking at discontinuous picture boundaries and/or discontinuous face edges.

SUMMARY

One of the objectives of the claimed invention is to provide a de-blocking method for a reconstructed projection-based frame that employs a projection layout of a 360-degree virtual reality (360 VR) projection. For example, a spherical neighbor based de-blocking method is employed by a de-blocking filter.

According to a first aspect of the present invention, an exemplary de-blocking method for a reconstructed projection-based frame is disclosed. The reconstructed projection-based frame comprises a plurality of projection faces packed in a projection layout of a 360-degree Virtual Reality (360 VR) projection from which a 360-degree image content of a sphere is mapped onto the projection faces. The exemplary de-blocking method includes: obtaining, by a de-blocking filter, a first spherical neighboring block for a first block with a block edge to be de-blocking filtered; and selectively applying de-blocking to the block edge of the first block for at least updating a portion of pixels of the first block. The projection faces comprise a first projection face and a second projection face, one face boundary of the first projection face connects with one face boundary of the second projection face, there is image content discontinuity between said one face boundary of the first projection face and said one face boundary of the second projection face, the first block is a part of the first projection face, the block edge of the first block is a part of said one face boundary of the first projection face, and a region on the sphere to which the first spherical neighboring block corresponds is adjacent to a region on the sphere from which the first projection face is obtained.

According to a second aspect of the present invention, an exemplary de-blocking method for a reconstructed projection-based frame is disclosed. The exemplary de-blocking method includes at least one projection face packed in a projection layout of a 360-degree Virtual Reality (360 VR) projection from which a 360-degree image content of a sphere is mapped onto said at least one projection face. The exemplary de-blocking method includes: obtaining, by a de-blocking filter, a spherical neighboring block for a current block with a block edge to be de-blocking filtered; and selectively applying de-blocking to the block edge of the current block for at least updating a portion of pixels of the current block. The current block is a part of one projection face packed in the reconstructed projection-based frame, the block edge of the current block is a part of a picture boundary of the reconstructed projection-based frame, and a region on the sphere to which the spherical neighboring block corresponds is adjacent to a region on the sphere from which said one projection face is obtained.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
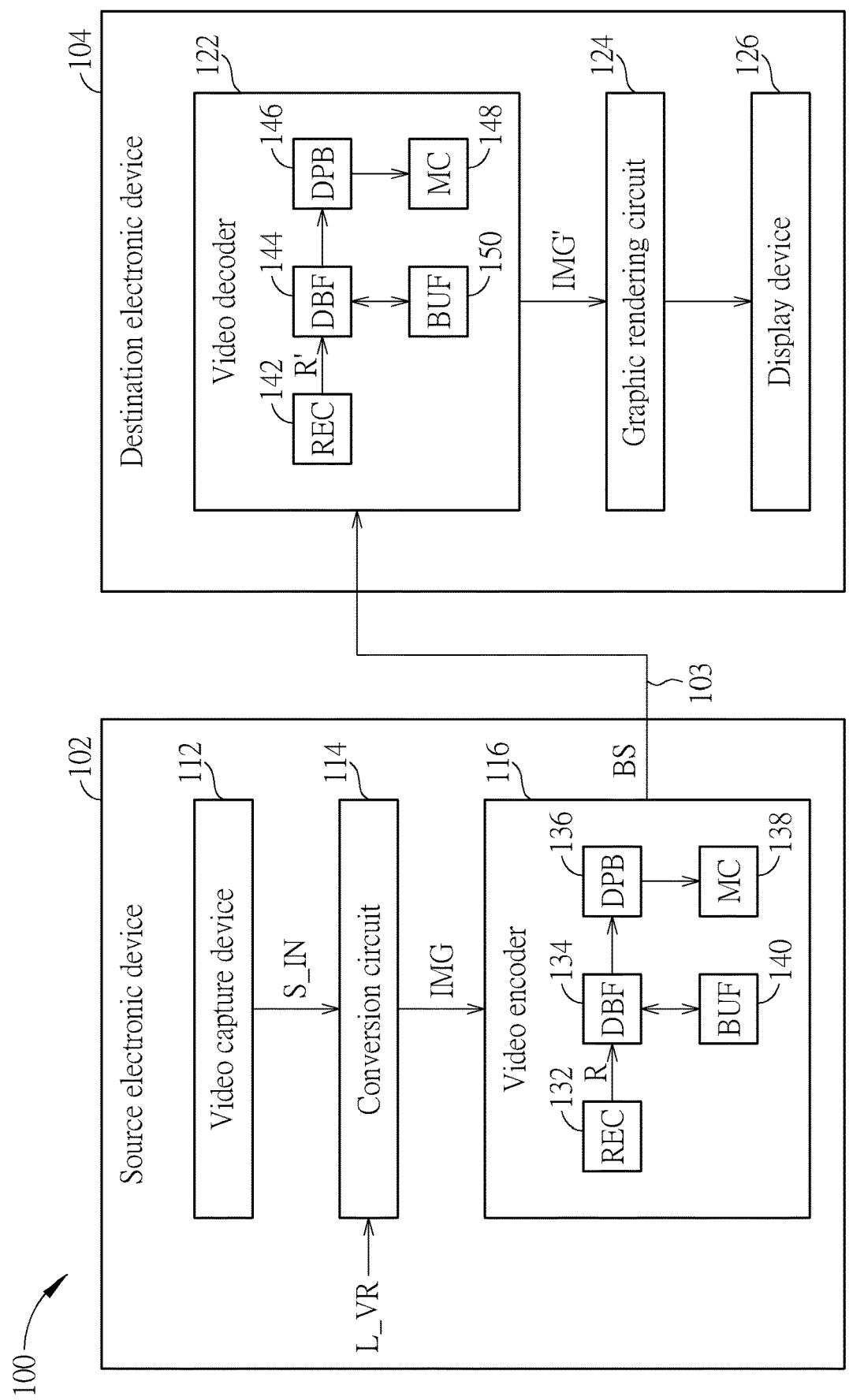
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image content S_IN. For example, the projection-based frame IMG may be one frame included in a sequence of projection-based frames generated from the conversion circuit 114. The video encoder 116 is an encoding circuit used to encode/compress the projection-based frame IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit used to receive the bitstream BS from the transmission means 103 (e.g., wired/wireless communication link or storage medium), and decode a part of the received bitstream BS to generate a decoded frame IMG'. For example, the video decoder 122 generates a sequence of decoded frames by decoding the received bitstream BS, where the decoded frame IMG' is one frame included in the sequence of decoded frames. In this embodiment, the projection-based frame IMG to be encoded by the video encoder 116 at the encoder side has the 360 VR projection layout L_VR. Hence, after a part of the bitstream BS is decoded by the video decoder 122 at the decoder side, the decoded frame IMG' is a decoded projection-based frame having the same 360 VR projection layout L_VR. The graphic rendering circuit 124 is coupled between the video decoder 122 and the display device 126. The graphic rendering circuit 124 renders and displays an output image data on the display device 126 according to the decoded frame IMG'. For example, a viewport area associated with a portion of the 360-degree image content carried by the decoded frame IMG' may be displayed on the display device 126 via the graphic rendering circuit 124.

The video encoder 116 may employ a block-based coding scheme for encoding the projection-based frame IMG. Hence, the video encoder 116 has a de-blocking filter (denoted by "DBF") 134 to reduce the blocky artifacts which appear after block-based coding. Specifically, a reconstructed projection-based frame R generated from a reconstruction circuit (denoted by "REC") 132 can be used as a reference frame for coding following blocks, and is stored into a reference frame buffer (denoted by "DPB") 136 through the de-blocking filter 134. For example, a motion compensation circuit (denoted by "MC") 138 can use a block found in the reference frame to act as a predicted block. In addition, an optional block buffer (denoted by "BUF") 140 can be used to store data required by a de-blocking filtering process performed at the de-blocking filter 134. The reconstructed projection-based frame R is generated by an internal decoding loop of the video encoder 116. In other words, the reconstructed projection-based frame R is reconstructed from encoded data of the projection-based frame IMG, and thus has the same 360 VR projection layout L_VR used by the projection-based frame IMG. It should be noted that the video encoder 116 may include other circuit blocks (not shown) required to achieve the designated encoding function.

The video decoder 122 is used to perform an inverse operation of a video encoding operation performed by the video encoder 116. Hence, the video decoder 122 has a de-blocking filter (denoted by "DBF") 144 to reduce the blocky artifacts. Specifically, a reconstructed projection-based frame R' generated from a reconstruction circuit (denoted by "REC") 142 can be used as a reference frame for decoding following blocks, and is stored into a reference frame buffer (denoted by "DPB") 146 through the de-blocking filter 144. For example, a motion compensation circuit (denoted by "MC") 148 can use a block found in the reference frame to act as a predicted block. In addition, an optional block buffer (denoted by "BUF") 150 can be used to store data required by a de-blocking filtering process performed at the de-blocking filter 144. The reconstructed projection-based frame R' is reconstructed from encoded data of the projection-based frame IMG, and thus has the same 360 VR projection layout L_VR used by the projection-based frame IMG. In addition, the decoded frame IMG' may be generated by passing the reconstructed projection-based frame R' through the de-blocking filter 144. It should be noted that the video decoder 122 may include other circuit blocks (not shown) required to achieve the designated decoding function.

In one exemplary design, the de-blocking filter 134/144 may be implemented by dedicated hardware used to perform a de-blocking filtering process upon a block edge. In another exemplary design, the de-blocking filter 134/144 may be implemented by a general purpose processor that executes a program code to perform a de-blocking filtering process upon a block edge. However, these are for illustrative purposes only, and are not meant to be limitations of the present invention.

Figure 2:
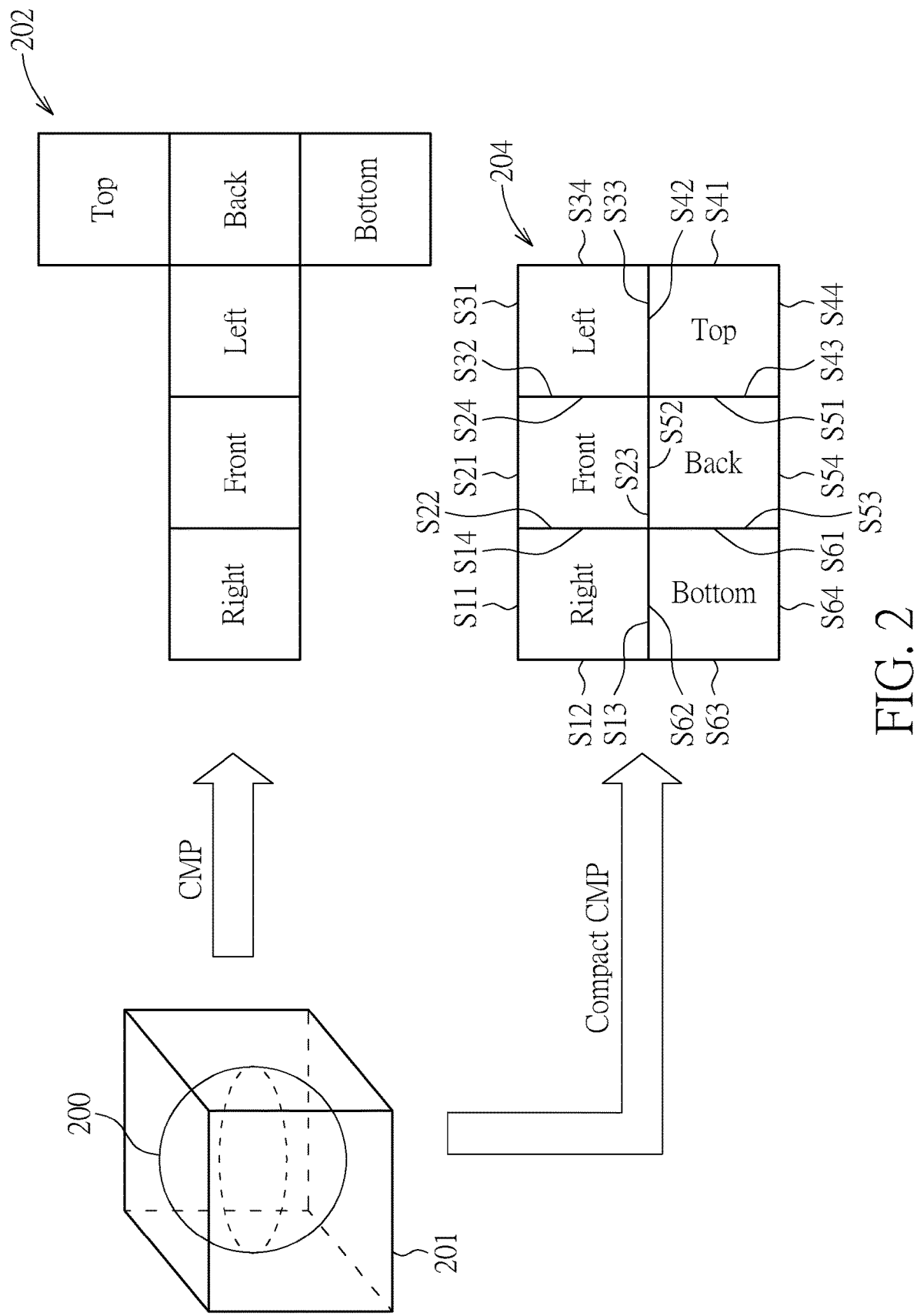
FIG. 2 is a diagram illustrating a cube-based projection according to an embodiment of the present invention.

As mentioned above, the conversion circuit 114 generates the projection-based frame IMG according to the 360 VR projection layout L_VR and the omnidirectional image content S_IN. In a case where the 360 VR projection layout L_VR is a cube-based projection layout, six square projection faces are derived from different faces of a cube through a cube-based projection of the omnidirectional image content S_IN on a sphere. FIG. 2 is a diagram illustrating a cube-based projection according to an embodiment of the present invention. The 360-degree image content on a sphere 200 is projected onto six faces of a cube 201, including a top face, a bottom face, a left face, a front face, a right face, and a back face. Specifically, an image content of a north polar region of the sphere 200 is projected onto the top face of the cube 201, an image content of a south polar region of the sphere 200 is projected onto the bottom face of the cube 201, and an image content of an equatorial region of the sphere 200 is projected onto the left face, the front face, the right face, and the back face of the cube 201.

Square projection faces to be packed in a projection layout of the cube-based projection are derived from six faces of the cube 201, respectively. For example, a square projection face (labeled by "Top") on a two-dimensional (2D) plane is derived from the top face of the cube 201 in a three-dimensional (3D) space, a square projection face (labeled by "Back") on the 2D plane is derived from the back face of the cube 201 in the 3D space, a square projection face (labeled by "Bottom") on the 2D plane is derived from the bottom face of the cube 201 in the 3D space, a square projection face (labeled by "Right") on the 2D plane is derived from the right face of the cube 201 in the 3D space, a square projection face (labeled by "Front") on the 2D plane is derived from the front face of the cube 201 in the 3D space, and a square projection face (labeled by "Left") on the 2D plane is derived from the left face of the cube 201 in the 3D space.

When the 360 VR projection layout L_VR is set by a cubemap projection (CMP) layout 202 shown in FIG. 2, the square projection faces "Top", "Back", "Bottom", "Right", "Front", and "Back" are packed in the CMP layout 202 corresponding to an unfolded cube. However, the projection-based frame IMG to be encoded is required to be rectangular. If the CMP layout 202 is directly used for creating the projection-based frame IMG, the projection-based frame IMG has to be filled with dummy areas (e.g., black areas, gray areas, or white areas) to form a rectangular frame for encoding. Alternatively, the projection-based frame IMG can have projected image data arranged in a compact projection layout to avoid using dummy areas (e.g., black areas, gray areas, or white areas). As shown in FIG. 2, the square projection faces "Top", "Back" and "Bottom" are rotated and then packed in the compact CMP layout 204. Hence, the square projection faces "Top", "Back", "Bottom", "Right", "Front", and "Back" are arranged in the compact CMP layout 204 that is a 3×2 layout. In this way, the coding efficiency can be improved.

However, in accordance with the compact CMP layout 204, it is possible that packing of square projection faces may result in image content discontinuity edges between adjacent square projection faces. As shown in FIG. 2, the projection-based frame IMG with the compact CMP layout 204 has a top sub-frame (which is one 3×1 face row consisting of square projection faces "Right", "Front" and "Left") and a bottom sub-frame (which is the other 3×1 face row consisting of square projection faces "Bottom", "Back" and "Top"). There is an image content discontinuity edge between the top sub-frame and the bottom sub-frame. Specifically, the face boundary S13 of the square projection face "Right" connects with the face boundary S62 of the square projection face "Bottom", the face boundary S23 of the square projection face "Front" connects with the face boundary S52 of the square projection face "Back", and the face boundary S33 of the square projection face "Left" connects with the face boundary S42 of the square projection face "Top", where there is image content discontinuity between face boundaries S13 and S62, there is image content discontinuity between face boundaries S23 and S52, and there is image content discontinuity between face boundaries S33 and S42.

Further, in accordance with the compact CMP layout 204, it is possible that packing of square projection faces may result in image content continuity edges between adjacent square projection faces. Regarding the top sub-frame, the face boundary S14 of the square projection face "Right" connects with the face boundary S22 of the square projection face "Front", and the face boundary S24 of the square projection face "Front" connects with the face boundary S32 of the square projection face "Left", where there is image content continuity between face boundaries S14 and S22, and there is image content continuity between face boundaries S24 and S32. Regarding the bottom sub-frame, the face boundary S61 of the square projection face "Bottom" connects with the face boundary S53 of the square projection face "Back", and the face boundary S51 of the square projection face "Back" connects with the face boundary S43 of the square projection face "Top", where there is image content continuity between face boundaries S61 and S53, and there is image content continuity between face boundaries S51 and S43.

Moreover, the compact CMP layout 204 has a top discontinuous boundary (which consists of face boundaries S11, S21, S31 of square projection faces "Right", "Front" and "Left"), a bottom discontinuous boundary (which consists of face boundaries S64, S54, S44 of square projection faces "Bottom", "Back" and "Top"), a left discontinuous boundary (which consists of face boundaries S12, S63 of square projection faces "Right" and "Bottom"), and a right discontinuous boundary (which consists of face boundaries S34, S41 of square projection faces "Left" and "Top").

A typical de-blocking filter applies de-blocking to a left edge and a top edge of a coded block in a reconstructed frame, and does not apply de-blocking to block edges located at picture boundaries of the reconstructed frame. However, an image content discontinuity edge between the top sub-frame and the bottom sub-frame of the reconstructed projection-based frame R/R' with the compact CMP layout 204 is caused by face packing rather than blocked-based coding. The picture quality of the reconstructed projection-based frame R/R' will be degraded by the typical de-blocking filter that applies a typical de-blocking filtering process to block edges located at the image content discontinuity edge between the top sub-frame and the bottom sub-frame of the reconstructed projection-based frame R/R'. To address this issue, the present invention proposes an innovative spherical neighbor based de-blocking method that can be implemented in the encoder-side de-blocking filter 134 and the decoder-side de-blocking filter 144. The proposed spherical neighbor based de-blocking method is capable of reducing seam artifacts when applying de-blocking to block edges located at the image content discontinuity edge between the top sub-frame and the bottom sub-frame of the reconstructed projection-based frame R/R', and is capable of applying de-blocking to block edges located at picture boundaries of the reconstructed projection-based frame R/R'. Further details of the proposed spherical neighbor based de-blocking method are described below with reference to the accompanying drawings.

In accordance with the proposed spherical neighbor based de-blocking method, the de-blocking filter 134/144 is configured to support 4 types of filter processes. For example, a first-type filter process is employed to control de-blocking of a block edge of a block when the block edge is located on a left face boundary of a projection face, a second-type filter process is employed to control de-blocking of a block edge of a block when the block edge is located on a top face boundary of a projection face, a third-type filter process is employed to control de-blocking of a block edge of a block when the block edge is located on a right face boundary of a projection face, and a fourth-type filter process is employed to control de-blocking of a block edge of a block when the block edge is located on a bottom face boundary of a projection face. Hence, based on a face boundary on which a block edge to be de-blocking filtered is located, the de-blocking filter 134/144 selects one of the first-type filter process, the second-type filter process, the third-type filter process, and the fourth-type filter process to control de-blocking of the block edge.

Figure 3:
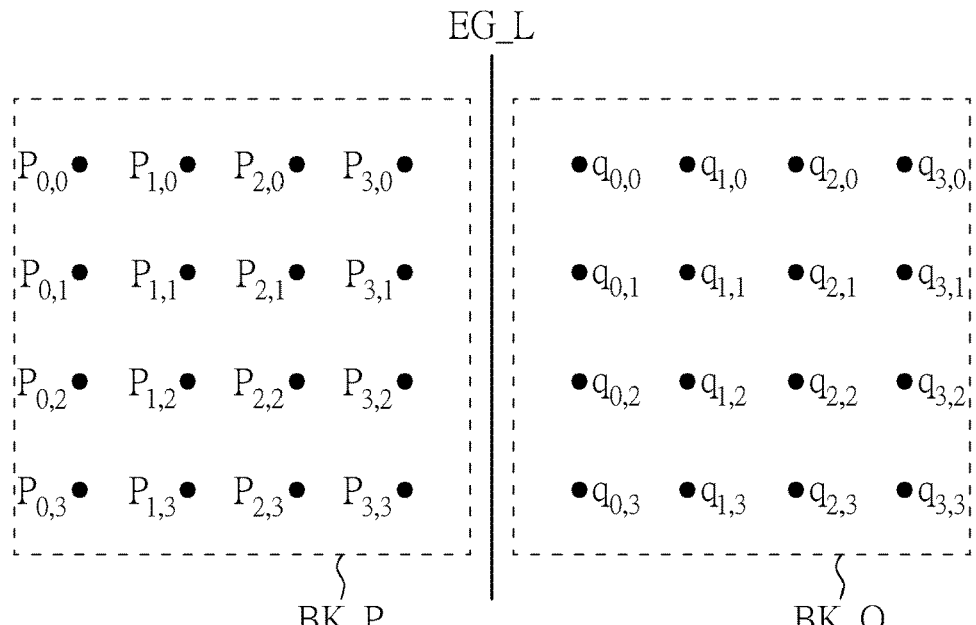
FIG. 3 is a diagram illustrating a first-type filter process according to an embodiment of the present invention.

FIG. 3 is a diagram illustrating the first-type filter process according to an embodiment of the present invention. The first-type filter process is applied to two 4×4 blocks, where the block BK_Q has pixels $q_{0,0}$-$q_{3,3}$ and denotes a current block in the reconstructed projection-based frame R/R' that has a block edge to be de-blocking filtered (particularly, a current block with a left block edge EG_L to be de-blocking filtered), and the block BK_P has pixels $p_{0,0}$-$p_{3,3}$ and denotes a neighboring block. The left block edge EG_L is located on a left face boundary of a projection face. The first-type filter process is to read 4 pixels and write 3 pixels on each side, and is applied to each row in two blocks BK_Q, BP_P.

Figure 4:
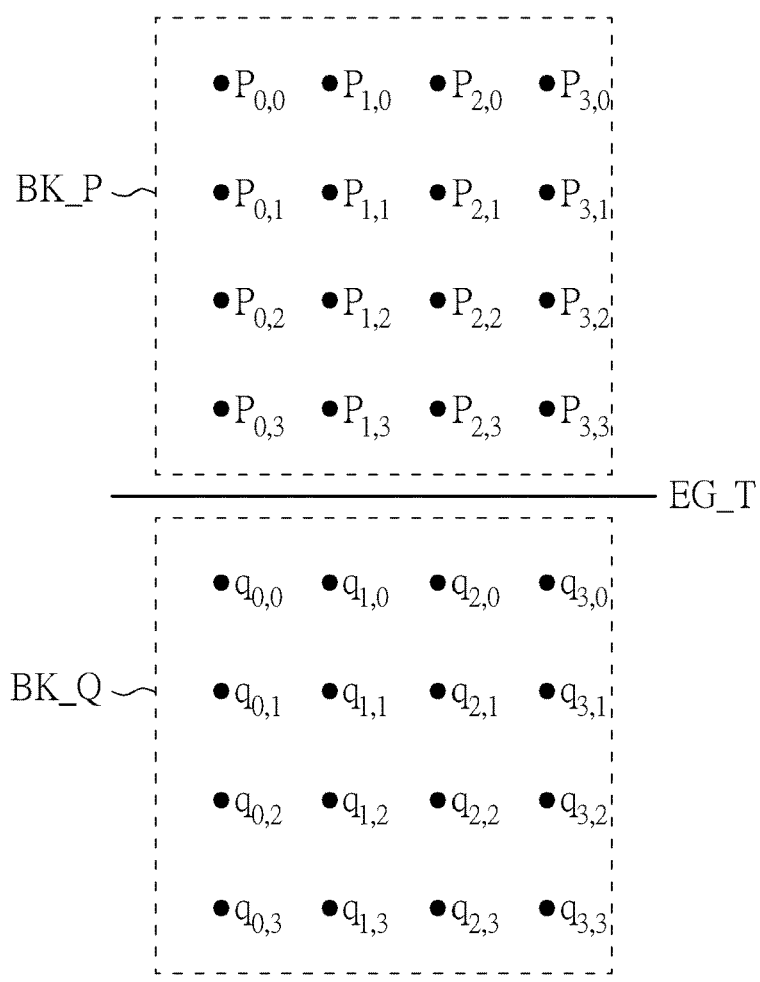
FIG. 4 is a diagram illustrating a second-type filter process according to an embodiment of the present invention.

FIG. 4 is a diagram illustrating the second-type filter process according to an embodiment of the present invention. The second-type filter process is applied to two 4×4 blocks, where the block BK_Q denotes a current block in the reconstructed projection-based frame R/R' that has a block edge to be de-blocking filtered (particularly, a current block with a top block edge EG_T to be de-blocking filtered), and the block BK_P denotes a neighboring block. The top block edge EG_T is located on a top face boundary of a projection face. The second-type filter process is to read 4 pixels and write 3 pixels on each side, and is applied to each column in two blocks BK_Q, BP_P.

Figure 5:
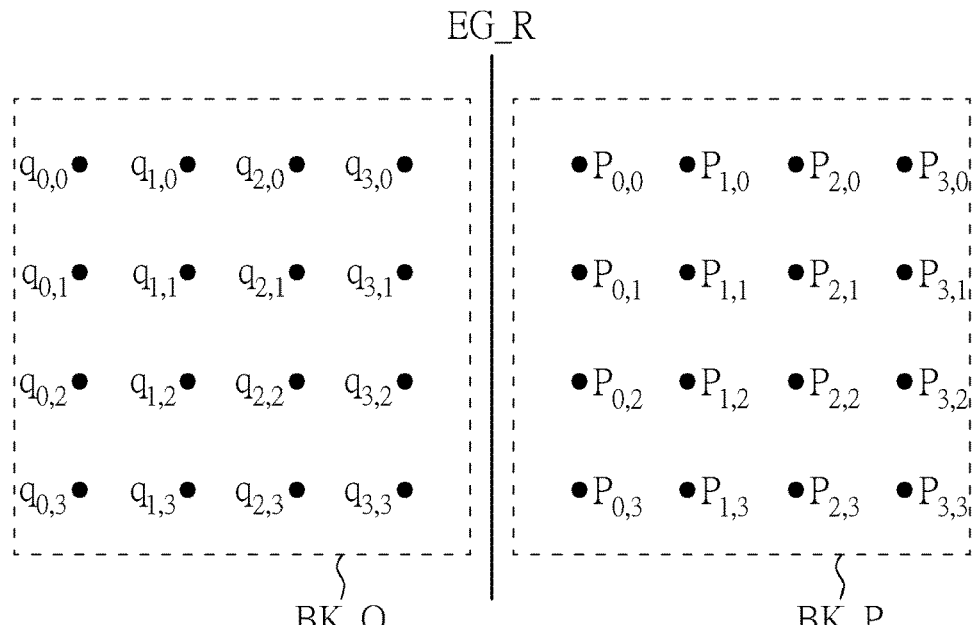
FIG. 5 is a diagram illustrating a third-type filter process according to an embodiment of the present invention.

FIG. 5 is a diagram illustrating the third-type filter process according to an embodiment of the present invention. The third-type filter process is applied to two 4×4 blocks, where the block BK_Q has pixels $q_{0,0}$-$q_{3,3}$ and denotes a current block in the reconstructed projection-based frame R/R' that has a block edge to be de-blocking filtered (particularly, a current block with a right block edge EG_R to be de-blocking filtered), and the block BK_P has pixels $p_{0,0}$-$p_{3,3}$ and denotes a neighboring block. The right block edge EG_R is located on a right face boundary of a projection face. The third-type filter process is to read 4 pixels and write 3 pixels on each side, and is applied to each row in two blocks BK_Q, BP_P.

Figure 6:
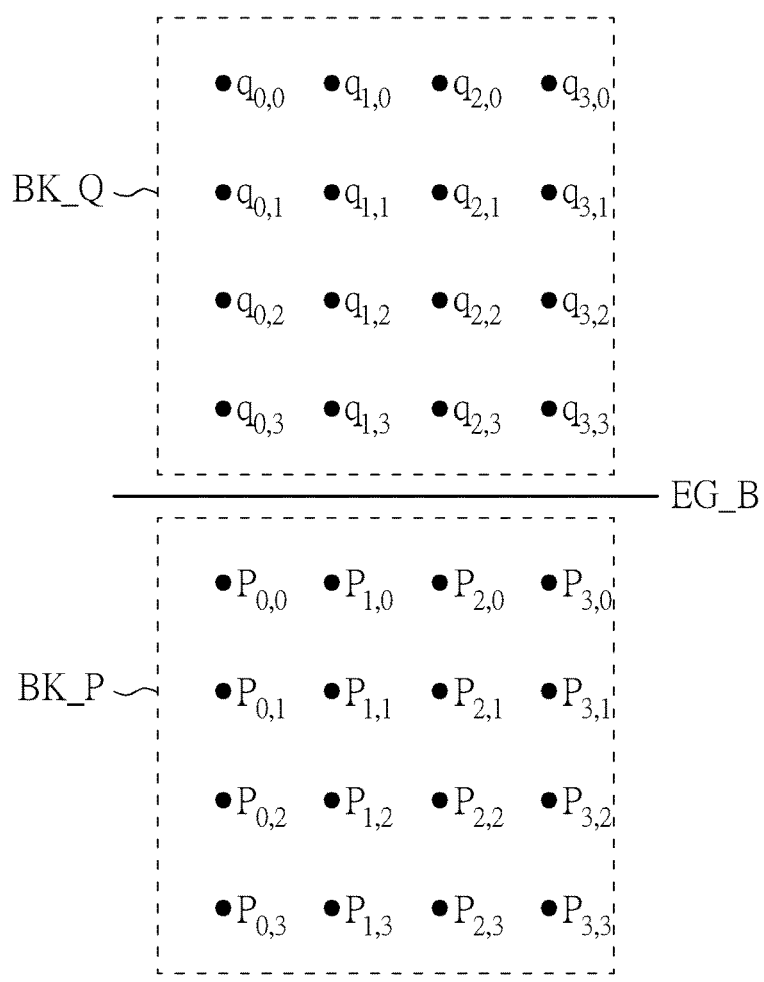
FIG. 6 is a diagram illustrating a fourth-type filter process according to an embodiment of the present invention.

FIG. 6 is a diagram illustrating the fourth-type filter process according to an embodiment of the present invention. The fourth-type filter process is applied to two 4×4 blocks, where the block BK_Q has pixels $q_{0,0}$-$q_{3,3}$ and denotes a current block in the reconstructed projection-based frame R/R' that has a block edge to be de-blocking filtered (particularly, a current block with a bottom block edge EG_B to be de-blocking filtered), and the block BK_P has pixels $p_{0,0}$-$p_{3,3}$ and denotes a neighboring block. The bottom block edge EG_B is located on a bottom face boundary of a projection face. The fourth-type filter process is to read 4 pixels and write 3 pixels on each side, and is applied to each column in two blocks BK_Q, BP_P.

Figure 7:
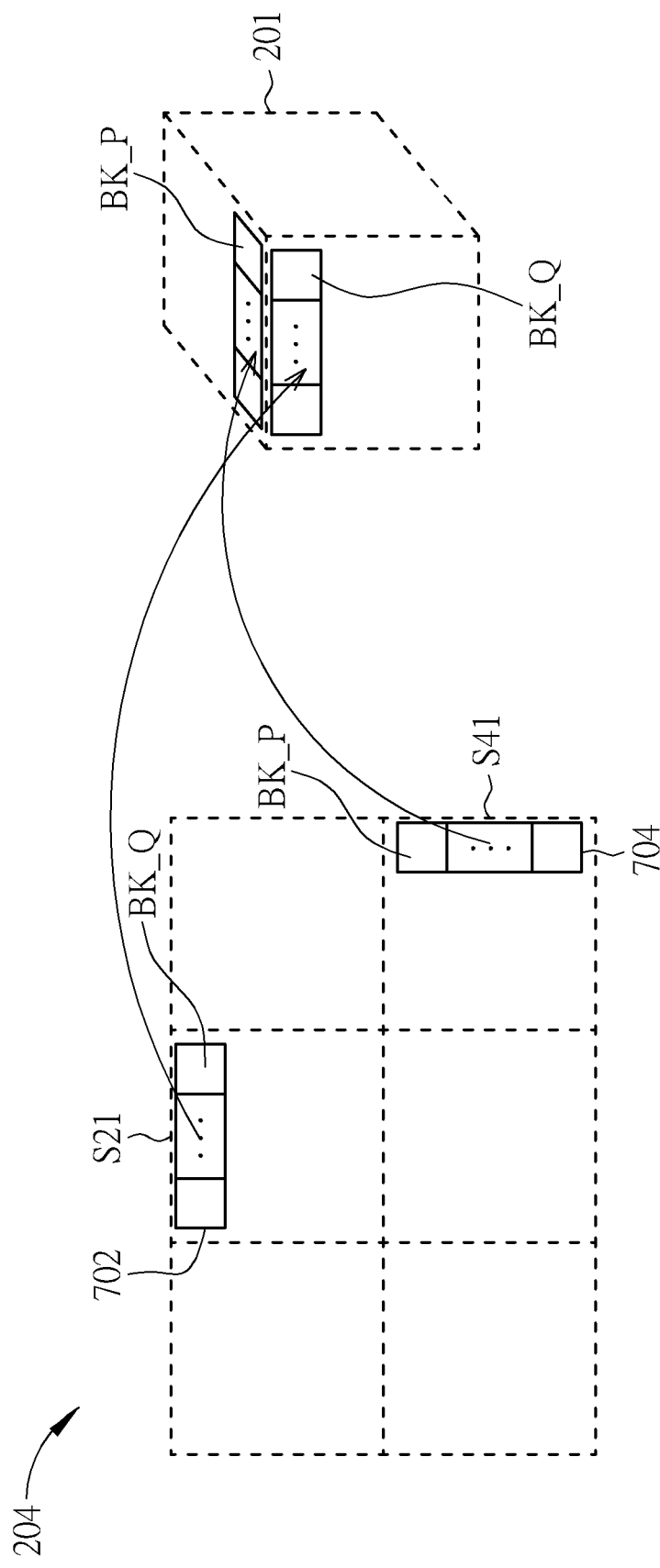
FIG. 7 is a diagram illustrating a spherical neighbor based de-blocking concept according to an embodiment of the present invention.

In accordance with the proposed spherical neighbor based de-blocking method, a neighboring block (e.g., BK_P) is a spherical neighboring block that is found under a condition that a block edge to be de-blocking filtered (e.g., EG_L, EG_T, EG_R, or EG_B) is located on a discontinuous picture boundary (e.g., S11, S21, S31, S12, S63, S64, S54, S44, S34, or S41 shown in FIG. 2) or a discontinuous face edge (e.g., S13, S23, S33, S62, S52, or S42 shown in FIG. 2). Hence, the de-blocking filter 134/144 is arranged to deal with search/generation of a spherical neighboring block. Please refer to FIG. 7 in conjunction with FIG. 2. FIG. 7 is a diagram illustrating a spherical neighbor based de-blocking concept according to an embodiment of the present invention. A block row 702 of the square projection face "Front" arranged in the compact CMP layout 204 includes a plurality of blocks, each having a top block edge on the face boundary S21. A block column 704 of the square projection face "Top" arranged in the compact CMP layout 204 includes a plurality of blocks, each having a right block edge on the face boundary S41. Since the square projection face "Top" arranged in the compact CMP layout 204 is derived from the top face of the cube 201 and the square projection face "Front" arranged in the compact CMP layout 204 is derived from the front face of the cube 201, there is image content continuity between the face boundary S21 of the square projection face "Front" and the face boundary S41 of the square projection face "Top". Hence, regarding the current block BK_Q to be de-blocking filtered, the block BK_P in the block column 704 is a 'real' neighboring block of the block BK_Q in the block row 702, and is selected by a de-blocking filtering process of the current block BK_Q according to the proposed spherical neighbor based de-blocking method. More specifically, a region on the sphere 200 to which the spherical neighboring block BK_P corresponds is adjacent to a region on the sphere 200 from which a projection face (which includes the current block BK_Q to be de-blocking filtered) is obtained. Since a spherical neighboring block can be found due to inherent geometry continuity characteristics of the 360 VR content that is projected onto projection faces packed in a 360 VR layout, the de-blocking filter 134/144 that employs the proposed spherical neighbor based de-blocking method is allowed to apply de-blocking to block edges on picture boundaries of the reconstructed projection-based frame R/R', and can apply de-blocking to block edges on discontinuous face edges inside the reconstructed projection-based frame R/R' (e.g., an image content discontinuity edge between a top sub-frame and a bottom sub-frame of the reconstructed projection-based frame R/R').

In one exemplary design, spherical neighboring blocks can be found by using a face based scheme. Hence, a spherical neighboring block is directly set by a copy of a block in a projection face packed in a reconstructed frame. In a case where there are multiple projection faces packed in a projection layout, a spherical neighboring block is found in another projection face different from one projection face at which a current block to be de-blocking filtered is located. In another case where there is only a single projection face packed in a projection layout, a spherical neighboring block is found in the same projection face at which a current block to be de-blocking filtered is located.

Figure 8:
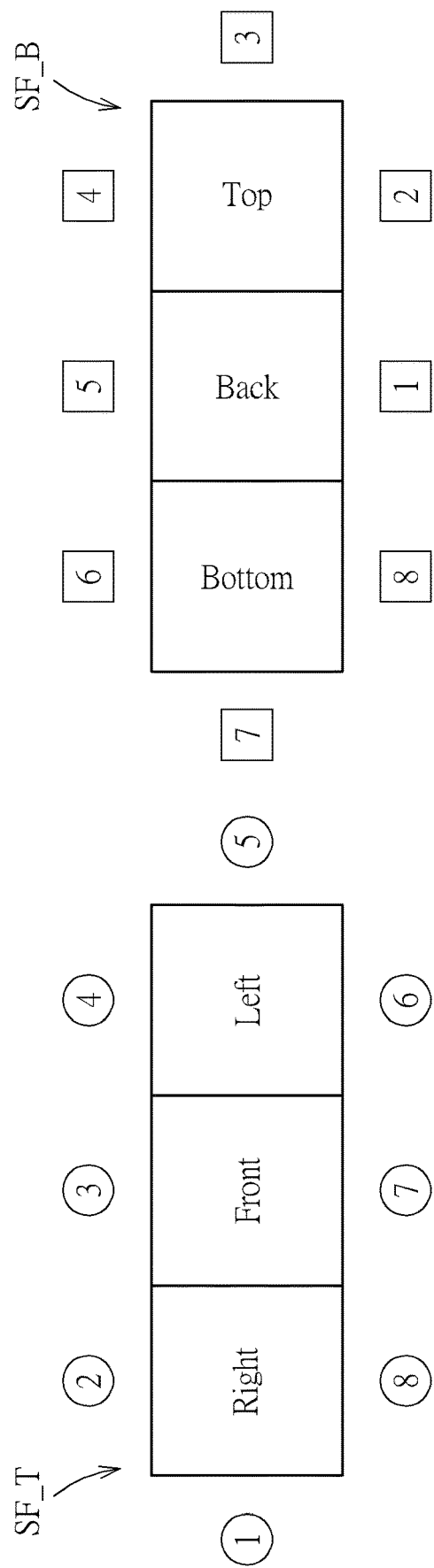
FIG. 8 is a diagram illustrating image content continuity relations among square projection faces packed in a compact cubemap projection layout shown in FIG. 2.

FIG. 8 is a diagram illustrating image content continuity relations among square projection faces packed in the compact CMP layout 204. The top sub-frame SF T of the reconstructed projection-based frame R/R' includes square projection faces "Right", "Front", and "Left". The bottom sub-frame SF B of the reconstructed projection-based frame R/R' includes square projection faces "Top", "Back", and "Bottom". There is image content continuity between face boundaries marked by the same reference numeral. Taking the square projection face "Top" in the bottom sub-frame SF B for example, a real adjacent projection face in the top sub-frame SF T that is adjacent to the face boundary marked by "4" is the square projection face "Left", a real adjacent projection face in the top sub-frame SF T that is adjacent to the face boundary marked by "3" is the square projection face "Front", and a real adjacent projection face in the top sub-frame SF T that is adjacent to the face boundary marked by "2" is the square projection face "Right". When the current block BK_Q in the square projection face "Top" has a top block edge on the face boundary marked by "4", the spherical neighboring block BK_P (which is required by a de-blocking filtering process of the top block edge of the current block BK_Q) is found from the square projection face "Left" by copying a block that has a top block edge on the face boundary marked by "4". When the current block BK_Q in the square projection face "Top" has a right block edge on the face boundary marked by "3", the spherical neighboring block BK_P (which is required by a de-blocking filtering process of the right block edge of the current block BK_Q) is found from the square projection face "Front" by copying a block that has a top block edge on the face boundary marked by "3". When the current block BK_Q in the square projection face "Top" has a bottom block edge on the face boundary marked by "2", the spherical neighboring block BK_P (which is required by a de-blocking filtering process of the bottom block edge of the current block BK_Q) is found from the square projection face "Right" by copying a block that has a top block edge on the face boundary marked by "2".

Figure 9:
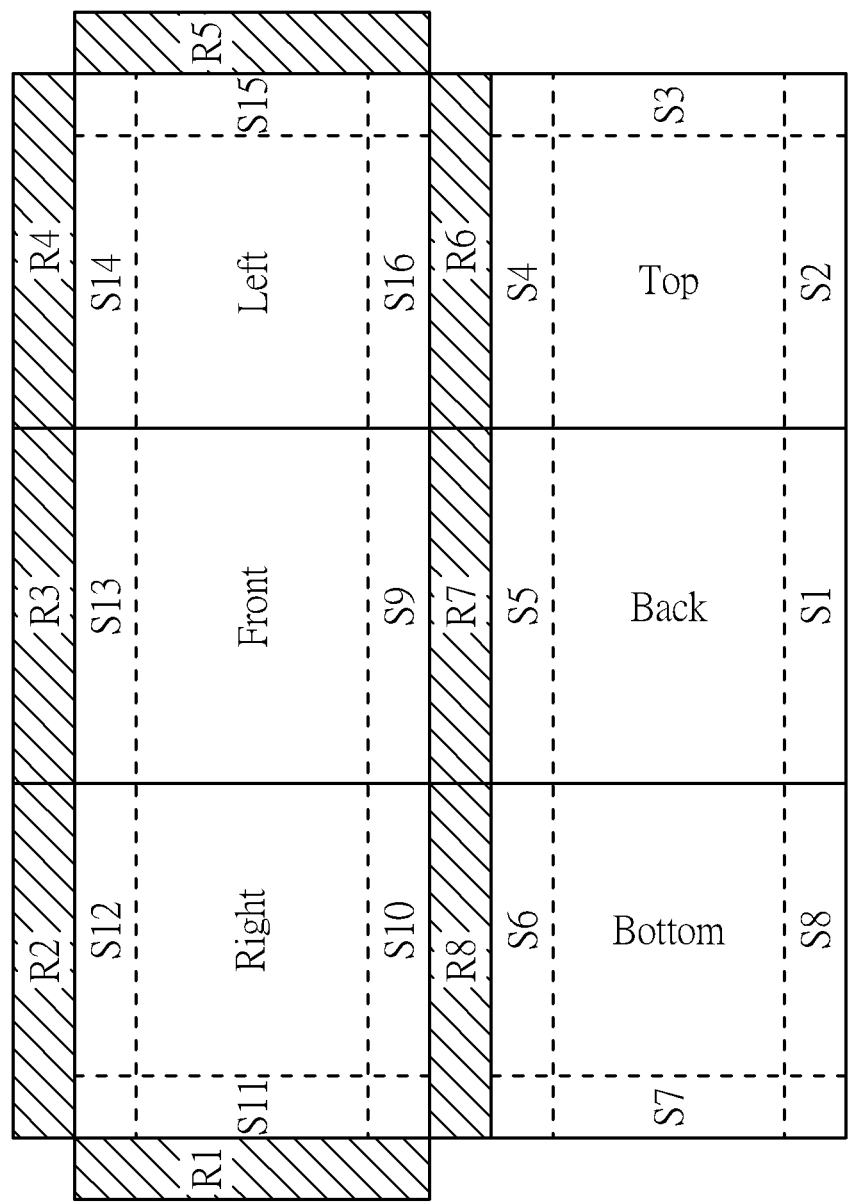
FIG. 9 is a diagram illustrating spherical neighboring blocks found by a face based scheme according to an embodiment of the present invention.

FIG. 9 is a diagram illustrating spherical neighboring blocks found by the face based scheme according to an embodiment of the present invention. Each of blocks in the block column S11 of the square projection face "Right" has a left block edge on a left face boundary of the square projection face "Right". An adjacent block column R1 includes spherical neighboring blocks copied from blocks in the block row S1 of the square projection face "Back". Hence, a de-blocking filtering process is performed upon each block edge on a left boundary of the top sub-frame by using a block of the block column S11 and a spherical neighboring block of the adjacent block column R1.

Each of blocks in the block column S15 of the square projection face "Left" has a right block edge on a right face boundary of the square projection face "Left". An adjacent block column R5 includes spherical neighboring blocks copied from blocks in the block row S5 of the square projection face "Back". Hence, a de-blocking filtering process is performed upon each block edge on a right boundary of the top sub-frame by using a block of the block column S15 and a spherical neighboring block of the adjacent block column R5.

Each of blocks in the block row S12 of the square projection face "Right" has a top block edge on a top face boundary of the square projection face "Right". An adjacent block row R2 includes spherical neighboring blocks copied from blocks in the block row S2 of the square projection face "Top". Each of blocks in the block row S13 of the square projection face "Front" has a top block edge on a top face boundary of the square projection face "Front". An adjacent block row R3 includes spherical neighboring blocks copied from blocks in the block column S3 of the square projection face "Top". Each of blocks in the block row S14 of the square projection face "Left" has a top block edge on a top face boundary of the square projection face "Left". An adjacent block row R4 includes spherical neighboring blocks copied from blocks in the block column S4 of the square projection face "Top". It should be noted that, when setting a spherical neighboring block, proper rotation may be needed for rotating a copied block obtained from one projection face.

A de-blocking filtering process is performed upon each block edge on a top boundary of the top sub-frame by using a block of the block row S12 and a spherical neighboring block of the adjacent block row R2, or by using a block of the block row S13 and a spherical neighboring block of the adjacent block row R3, or by using a block of the block row S14 and a spherical neighboring block of the adjacent block row R4.

Each of blocks in the block row S10 of the square projection face "Right" has a bottom block edge on a bottom face boundary of the square projection face "Right". An adjacent block row R8 includes spherical neighboring blocks copied from blocks in the block row S8 of the square projection face "Bottom". Each of blocks in the block row S9 of the square projection face "Front" has a bottom block edge on a bottom face boundary of the square projection face "Front". An adjacent block row R7 includes spherical neighboring blocks copied from blocks in the block column S7 of the square projection face "Bottom". Each of blocks in the block row S16 of the square projection face "Left" has a bottom block edge on a bottom face boundary of the square projection face "Left". An adjacent block row R6 includes spherical neighboring blocks copied from blocks in the block row S6 of the square projection face "Bottom". It should be noted that, when setting a spherical neighboring block, proper rotation may be needed for rotating a copied block obtained from one projection face.

A de-blocking filtering process is performed upon each block edge on a bottom boundary of the top sub-frame by using a block of the block row S10 and a spherical neighboring block of the adjacent block row R8, or by using a block of the block row S9 and a spherical neighboring block of the adjacent block row R7, or by using a block of the block row S16 and a spherical neighboring block of the adjacent block row R6.

During the de-blocking filtering process, the same block edge on the sub-frame boundary could be visited twice. In order to avoid applying de-blocking to the same block edge twice, the filtering process of the block edge is skipped if the block edge has been filtered. For example, the adjacent block column R1 includes spherical neighboring blocks copied from blocks in the block row S1 of the square projection face "Back", and a de-blocking filtering process is performed upon each block edge on a left boundary of the top sub-frame by using a block of the block column S11 and a spherical neighboring block of the adjacent block column R1. Hence, the de-blocking filtering process may update a portion of pixels included in a spherical neighboring block in the adjacent block column R1, and may write updated pixels of the spherical neighboring block in the adjacent block column R1 into the block row S1 of the square projection face "Back" to replace original pixels in the block row S1. After de-blocking filtering of each block edge on the left boundary of the top sub-frame is done, there is no need to apply a de-blocking filtering process to a bottom block edge of each block in the block row S1 due to the fact that the same edge exists between the left face boundary of the square projection face "Right" and the bottom face boundary of the square projection face "Back".

In some embodiments of the present invention, the face based scheme finds spherical neighboring blocks and stores pixels of the found spherical neighboring blocks into the block buffer 140/150 before the de-blocking filtering process. After the de-blocking filtering process, all of the filtered spherical neighboring blocks stored in the block buffer 140/150 may be discarded directly, or may be replaced/overwritten by new spherical neighboring blocks stored into the block buffer 140/150. There is tradeoff between the buffer size and the computational complexity. To reduce the memory usage of the block buffer 140/150, a spherical neighboring block can be found by the face based scheme in an on-the-fly manner, and pixels in the spherical neighboring block can be found and loaded dynamically when needed. In other words, during the de-blocking filtering process, spherical neighboring pixels can be found and loaded on demand. When the on-the-fly computation of spherical neighboring pixels is implemented in one or both of the de-blocking filters 134 and 144, the block buffer 140 can be omitted from the video encoder 116, and/or the block buffer 150 can be omitted from the video decoder 122. However, the execution time of the spherical neighbor based de-blocking filtering method may be longer due to the on-the-fly computation which uses the face based scheme to find needed spherical neighboring pixels on demand.

Figure 10:
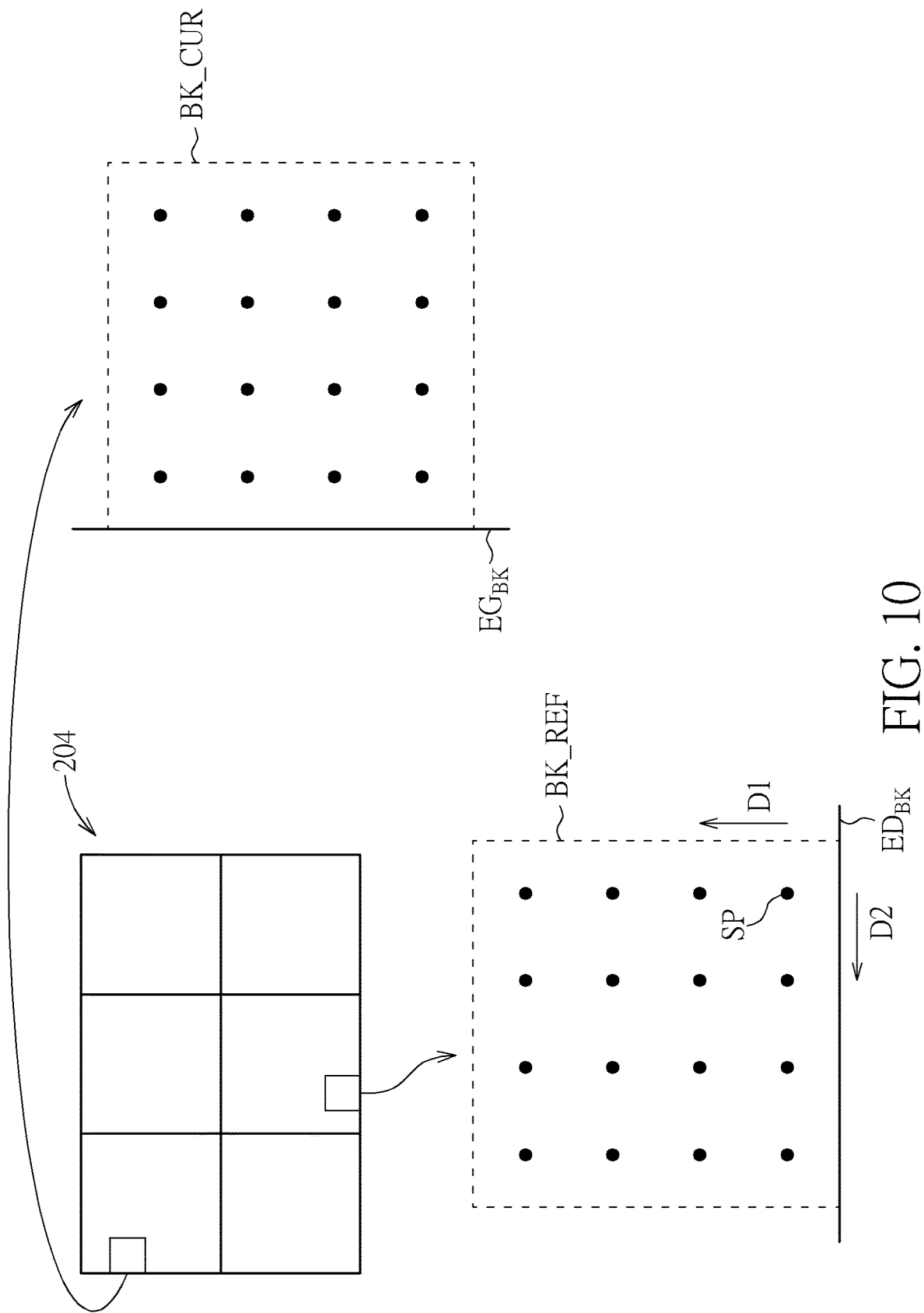
FIG. 10 is a diagram illustrating an operation of finding pixels of a spherical neighboring block in an on-the-fly manner according to an embodiment of the present invention.

FIG. 10 is a diagram illustrating an operation of finding pixels of a spherical neighboring block in an on-the-fly manner according to an embodiment of the present invention. In this embodiment, three parameters SP, D1, and D2 of a reference block BK_REF (which includes pixels of a spherical neighboring block required by a de-blocking filtering process of a current block BK_CUR) should be set before the de-blocking filtering process. Since the current block BK_CUR and the reference block BK_REF are real adjacent blocks due to image content continuity between a left block edge of the current block BK_CUR and a bottom block edge of the reference block BK_REF, the current block BK_CUR and the reference block BK_REF share the same block edge $EG_{BK}$ as shown in FIG. 10. In this example, the current block BK_CUR is a part of the square projection face "Right" in the compact CMP layout 204, and the reference block BK_REF is a part of the square projection face "Back" in the compact CMP layout 204. The reference block BK_REF is selected as a spherical neighboring block for the current block BK_CUR according to the face based scheme. A setting of the parameter SP is indicative of a position of a pixel which is included in the square projection face "Back", located at a first filter line, and closest to the block edge $EG_{BK}$. It should be noted that, since the de-blocking filtering process is applied to the block edge $EG_{BK}$, the first filter line includes 4 pixels located at the topmost pixel row of the current block BK_CUR and 4 pixels located at the rightmost pixel column of the reference block BK_REF. A setting of the parameter D1 is indicative of a pixel offset value used to find a next pixel in a filter line. A setting of the parameter D2 is indicative of a line offset value used to find a next filter line. The de-blocking filter 134/144 dynamically reads each of spherical neighboring pixels from the reference block BK_REF in the square projection face "Back" according to the parameters SP, D1 and D2. Hence, the block buffer 140 may be omitted from the video encoder 116, and the block buffer 150 may be omitted from the video decoder 122. In this way, production costs of the video encoder 116 and the video decoder 122 can be reduced.

In another exemplary design, spherical neighboring blocks can be found by using a geometry based scheme. In accordance with the geometry based scheme, spherical neighboring pixels included in a spherical neighboring block are found by 3D projection. In a case where there are multiple projection faces packed in a projection layout, the geometry based scheme applies geometry mapping to projected pixel(s) on an extended area of a projection face (which includes a current block to be de-blocking filtered) to find point (s) on another projection face (which is a real adjacent face), and derives spherical neighboring pixel(s) included in a spherical neighboring block from the point(s). In another case where there is only a single projection face packed in a projection layout, the geometry based scheme applies geometry mapping to projected pixel (s) on an extended area of a projection face to find point(s) on the same projection face, and derives spherical neighboring pixel(s) from the point(s).

Figure 11:
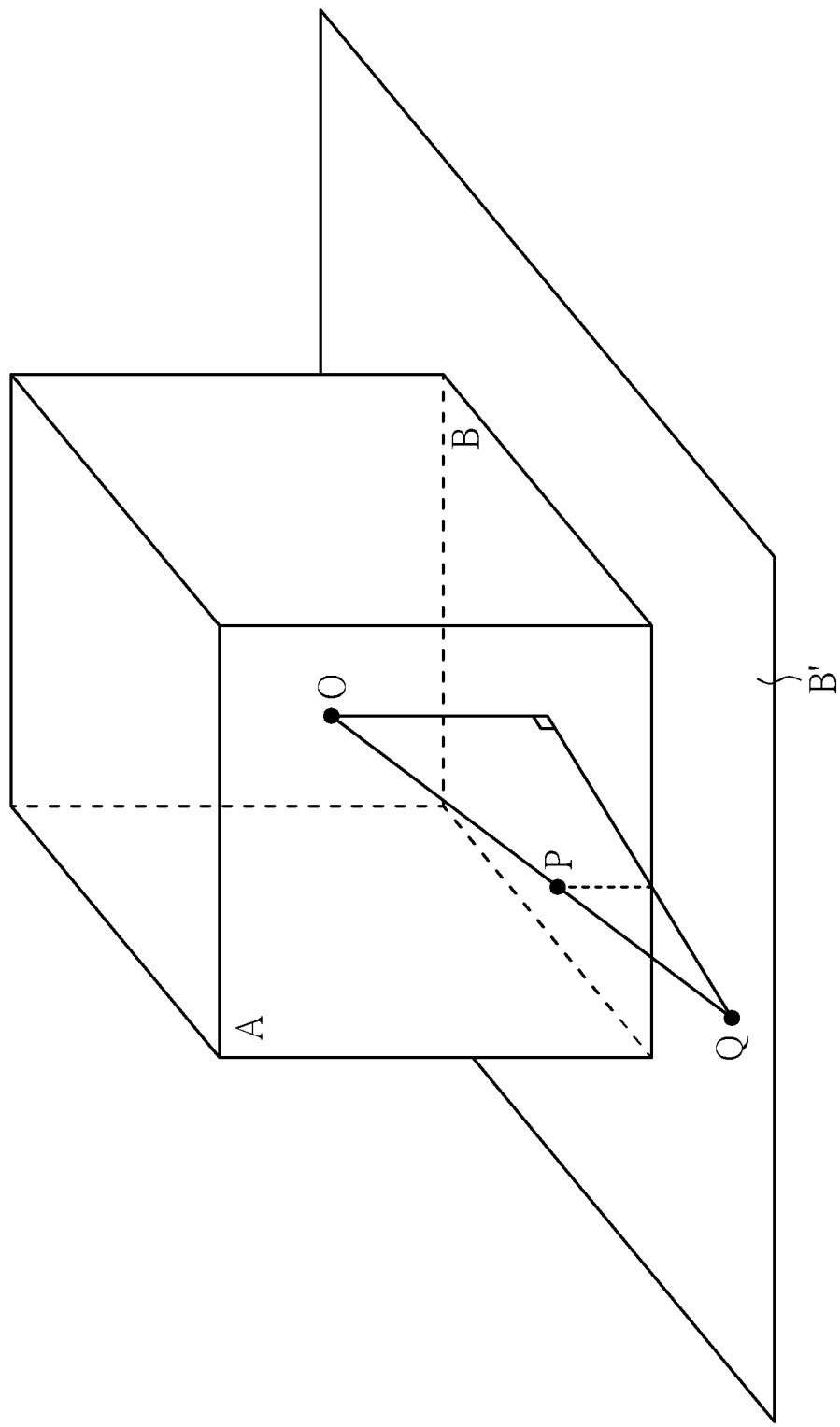
FIG. 11 is a diagram illustrating a spherical neighboring pixel found by a geometry based scheme according to an embodiment of the present invention.
Figure 12:
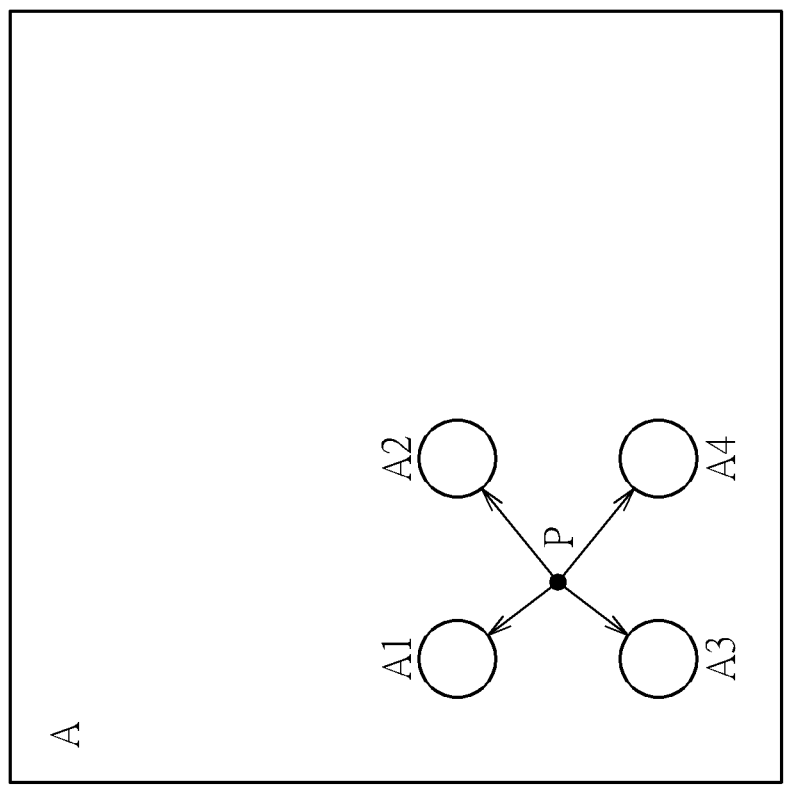
FIG. 12 is a diagram illustrating an example of generating an interpolated pixel value for a point according to an embodiment of the present invention.

FIG. 11 is a diagram illustrating a spherical neighboring pixel found by a geometry based scheme according to an embodiment of the present invention. A current block to be de-blocking filtered is located at a face B (e.g., bottom face of cube 201). To determine a pixel value of a projected pixel (which is a spherical neighboring pixel) Q on an extended area B' of the face B, a point P on a face A (e.g., front face of cube 201) is found. As shown in FIG. 11, the point P is an intersection point of the face A and a straight line $\overline{OQ}$ (which is from a projection center O (e.g., a center of the sphere 200) to the projected pixel Q). The pixel value of the point P is used for setting the pixel value of the projected pixel Q. In a case where the point P is an integer-position pixel of the face A, the pixel value of the projected pixel Q is directly set by the pixel value of the integer-position pixel. In another case where the point P is not an integer-position pixel of the face A, interpolation is performed to determine the pixel value of the point P. FIG. 12 is a diagram illustrating an example of generating an interpolated pixel value for the point P according to an embodiment of the present invention. In this example, pixel values of four nearest integer-position pixels A1, A2, A3, and A4 in the proximity of the point P are blended by interpolation for generating an interpolated pixel value to act as the pixel value of the point P. Hence, the pixel value of the projected pixel Q is set by the interpolated pixel value of the point P. However, this interpolation design is for illustrative purposes only, and is not meant to be a limitation of the present invention. In practice, an interpolation filter used by the geometry based scheme may be a nearest neighbor filter, a bilinear filter, a bicubic filter, or Lanczos filter, depending upon the actual design considerations.

In some embodiments of the present invention, the geometry based scheme finds spherical neighboring blocks and stores pixels of the found spherical neighboring blocks into the block buffer 140/150 before the de-blocking filtering process. After the de-blocking filtering process, all of the filtered spherical neighboring blocks stored in the block buffer 140/150 may be discarded directly, or may be replaced/overwritten by new spherical neighboring blocks stored into the block buffer 140/150, or may be further used for blending. There is tradeoff between the buffer size and the computational complexity. To reduce the memory usage of the block buffer 140/150, a spherical neighboring block can be found by the geometry based scheme in an on-the-fly manner, and pixels in the spherical neighboring block can be found and loaded dynamically when needed. In other words, during the de-blocking filtering process, spherical neighboring pixels can be found and loaded on demand. When the on-the-fly computation of spherical neighboring pixels is implemented in the de-blocking filters 134 and 144, the block buffer 140 can be omitted from the video encoder 116, and the block buffer 150 can be omitted from the video decoder 122. However, the execution time of the spherical neighbor based de-blocking filtering method may be longer due to the on-the-fly computation which uses the geometry based scheme to find needed spherical neighboring pixels on demand.

Figure 13:
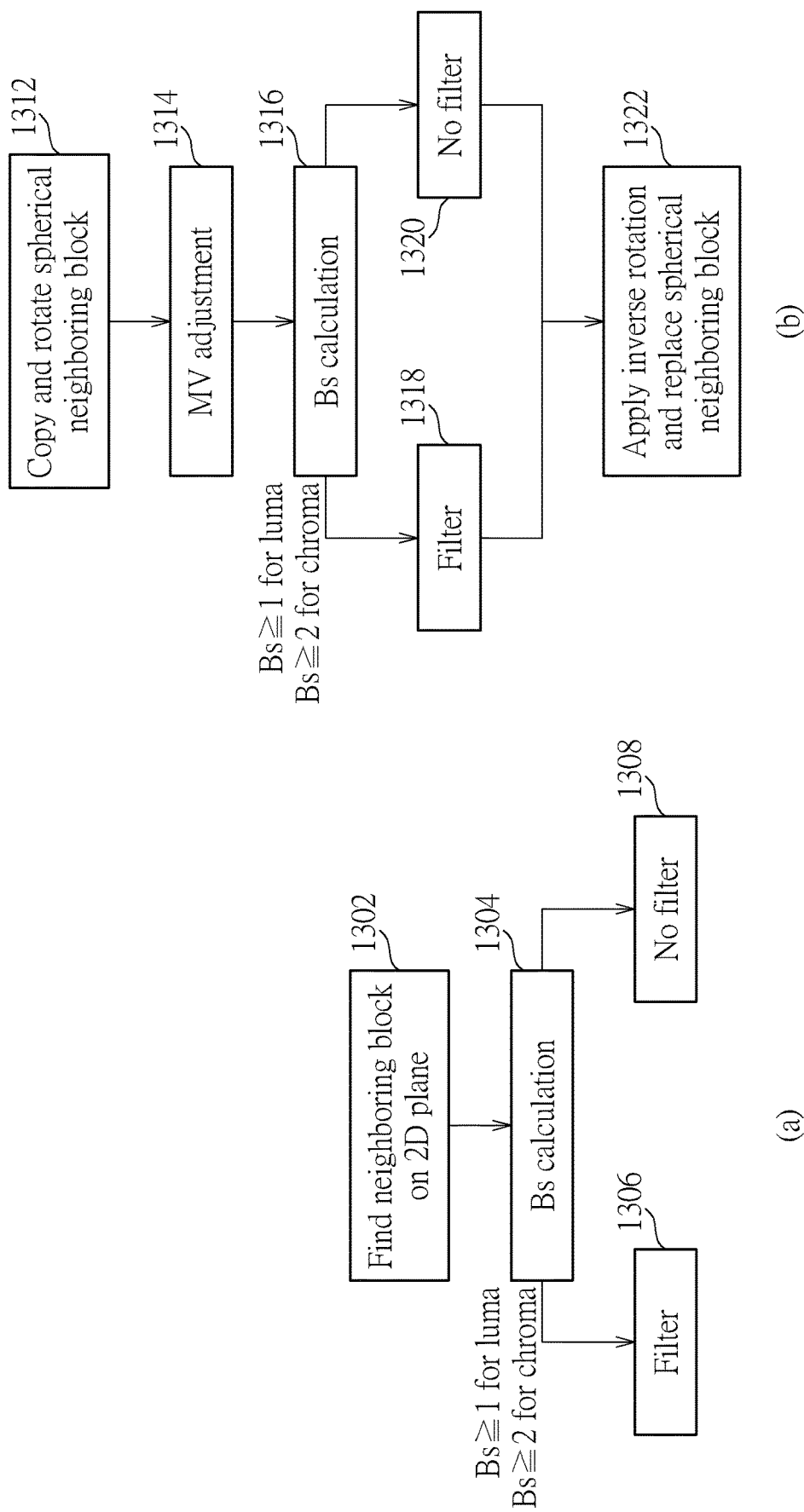
FIG. 13 is a flowchart illustrating a first spherical neighbor based de-blocking method according to an embodiment of the present invention.

FIG. 13 is a flowchart illustrating a first spherical neighbor based de-blocking method according to an embodiment of the present invention. A processing flow of the de-blocking filter 134/144 includes a first phase shown in the sub-diagram (a) of FIG. 13 and a second phase shown in the sub-diagram (b) of FIG. 13. In accordance with the first phase, the spherical neighbor based de-blocking method is applied to all block edges inside the reconstructed projection-based frame R/R' except block edges located on the discontinuous edge between the top sub-frame and the bottom sub-frame of the reconstructed projection-based frame R/R'. In other words, the first phase of the spherical neighbor based de-blocking method is applied to each block that is not on any sub-frame boundary. At step 1302, a neighboring block on the 2D plane is found for a current block with a block edge that is not on any sub-frame boundary. At step 1304, the boundary strength (Bs) of the block edge is calculated. The boundary strength of the block edge represents the degree of discontinuity of two adjacent blocks. The value of boundary strength depends on properties of the current block and the neighboring block, and is assigned as below.

| Conditions | Bs |
| --- | --- |
| At least one of these two blocks is an intra block | 2 |
| The boundary is a transform block edge and at least one of these two blocks contains non-zero transform coefficients | 1 |
| Absolute differences between corresponding motion vector of these two blocks are ≥1 integer-sample unit | 1 |
| The reference pictures or the number of motion vectors are different for these two blocks | 1 |
| Else | 0 |

The de-blocking filter 134/144 may include a luma filter and a chroma filter. When Bs=2, the luma filter is on, and the chroma filter is on. When Bs=1, the luma filter is on, and the chroma filter is off. When Bs=0, the luma filter is off, and the chroma filter is off. At step 1306, one or both of the luma filter and the chroma filter are enabled due to Bs≥1 or Bs≥2. At step 1308, none of the luma filter and the chroma filter is enabled due to Bs=0.

In accordance with the second phase, the spherical neighbor based de-blocking method is applied to block edges on picture boundaries of the reconstructed projection-based frame R/R' and block edges on the discontinuous edge between the top sub-frame and the bottom sub-frame of the reconstructed projection-based frame R/R'. In other words, the second phase of the spherical neighbor based de-blocking method is applied to each block that is on any of the sub-frame boundaries. At step 1312, a spherical neighboring block (which is required by a de-blocking filtering process of the current block) is stored into the block buffer 140/150 by copying a block found in a square projection face packed in the reconstructed projection-based frame R/R' and then properly rotating the copied block. A proper rotation is to ensure that the spherical neighboring block has correct image content continuity with respect to a block edge to be de-blocking filtered. Taking a spherical neighboring block in the adjacent block column R1 shown in FIG. 9 for example, a block in the block row S1 of the square projection face "Back" is copied, and then the spherical neighboring block is obtained through rotating the copied block 90 degrees counterclockwise.

At step 1314, a motion vector (MV) adjustment process is performed upon a motion vector of the spherical neighboring block (which is an inter block) to generate an adjusted motion vector for the spherical neighboring block. Hence, the de-blocking filter 134/144 may be further arranged to deal with motion vector adjustment before boundary strength determination. Although the motion vector adjustment may lead to higher computational complexity, a motion vector of a neighboring block that is involved in determination of the boundary strength can be more accurate.

Figure 14:
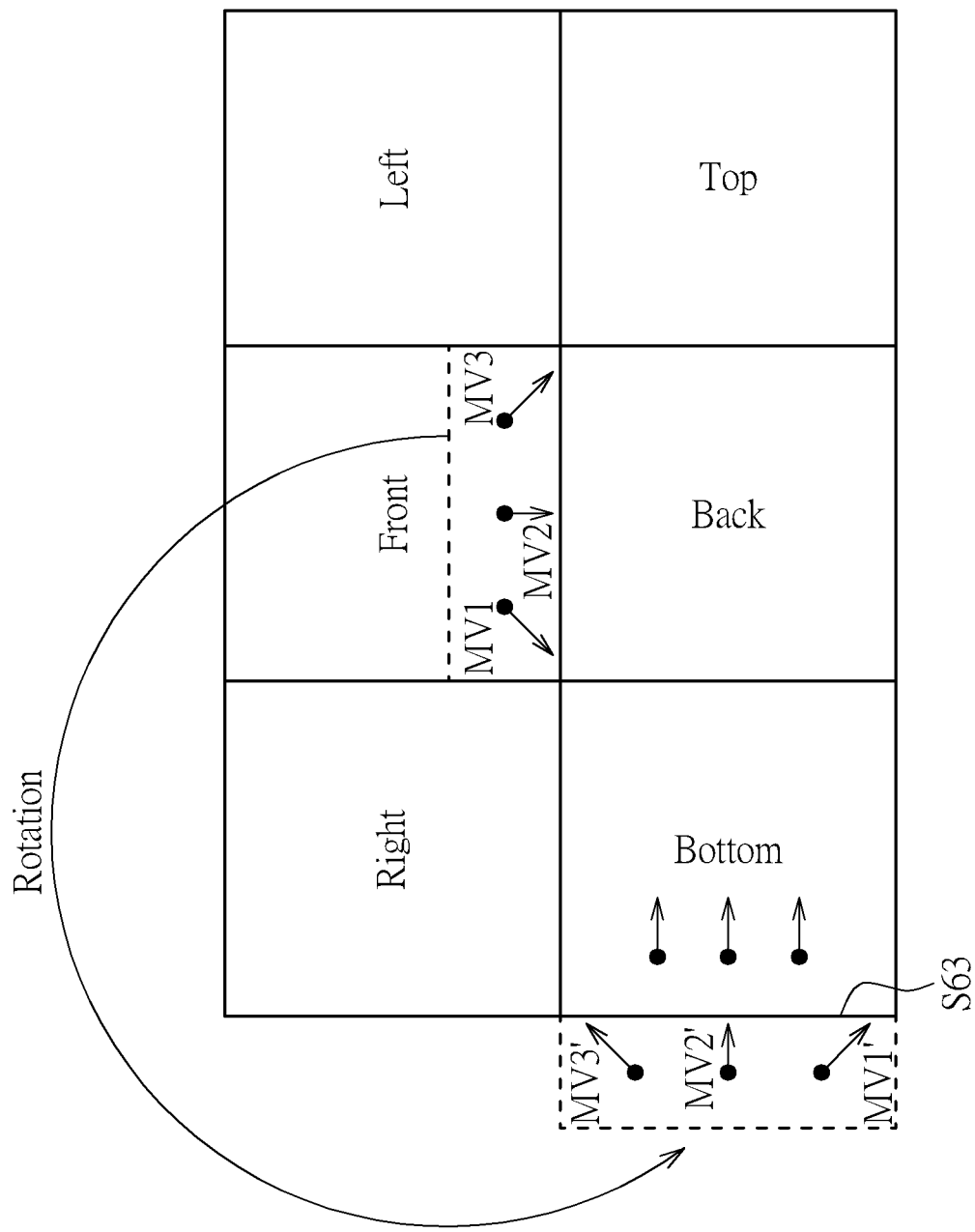
FIG. 14 is a diagram illustrating a first motion vector adjustment scheme according to an embodiment of the present invention.

In one exemplary design, an adjusted motion vector of a spherical neighboring block can be generated on the basis of frame packing information of the projection layout. For example, a rotation angle is determined according to the frame packing information of the projection layout, and the adjusted motion vector is obtained by rotating a motion vector of the spherical neighboring block by the rotation angle. FIG. 14 is a diagram illustrating a first motion vector adjustment scheme according to an embodiment of the present invention. When a de-blocking filtering process is applied to blocks that are included in the square projection face "Bottom" and have block edges located on the face boundary S63, spherical neighboring blocks are found in the square projection face "Front". As shown in FIG. 14, the spherical neighboring blocks are obtained from blocks included in the square projection face "Front", where one block has a motion vector MV1, another block has a motion vector MV2, and yet another block has a motion vector MV3. Hence, an original motion vector of one spherical neighboring block is MV1, an original motion vector of another spherical neighboring block is MV2, and an original motion vector of yet another spherical neighboring block is MV3. According to the frame packing information of the compact CMP layout 204, a motion vector could be rotated 0, 90, 180, or 270 degrees counterclockwise, depending upon locations of faces packed in the compact CMP layout 204. In this example, the rotation angle is set by 90 degrees counterclockwise. Hence, an adjusted motion vector MV1' of one spherical neighboring block is obtained by applying a 90-degree counterclockwise rotation to the original motion vector MV1, an adjusted motion vector MV2' of another spherical neighboring block is obtained by applying a 90-degree counterclockwise rotation to the original motion vector MV2, and an adjusted motion vector MV3' of yet another spherical neighboring block is obtained by applying a 90-degree counterclockwise rotation to the original motion vector MV3.

In another exemplary design, an adjusted motion vector of a spherical neighboring block can be generated by 3D projection. For example, geometry transformation is applied to an original motion vector of a spherical neighboring block to determine an adjusted motion vector for the spherical neighboring block. In a case where there are multiple projection faces packed in a projection layout, a projected motion vector on an extended area of a projection face (which includes a current block to be de-blocking filtered) is determined by applying geometry transformation to a motion vector of a spherical neighboring block in another projection face, where the projected motion vector is used as the adjusted motion vector of the spherical neighboring block. In another case where there is only a single projection face packed in a projection layout, a projected motion vector on an extended area of a projection face (which includes a current block to be de-blocking filtered) is determined by applying geometry transformation to a motion vector of a spherical neighboring block in the same projection face, where the projected motion vector is used as the adjusted motion vector of the spherical neighboring block.

Figure 15:
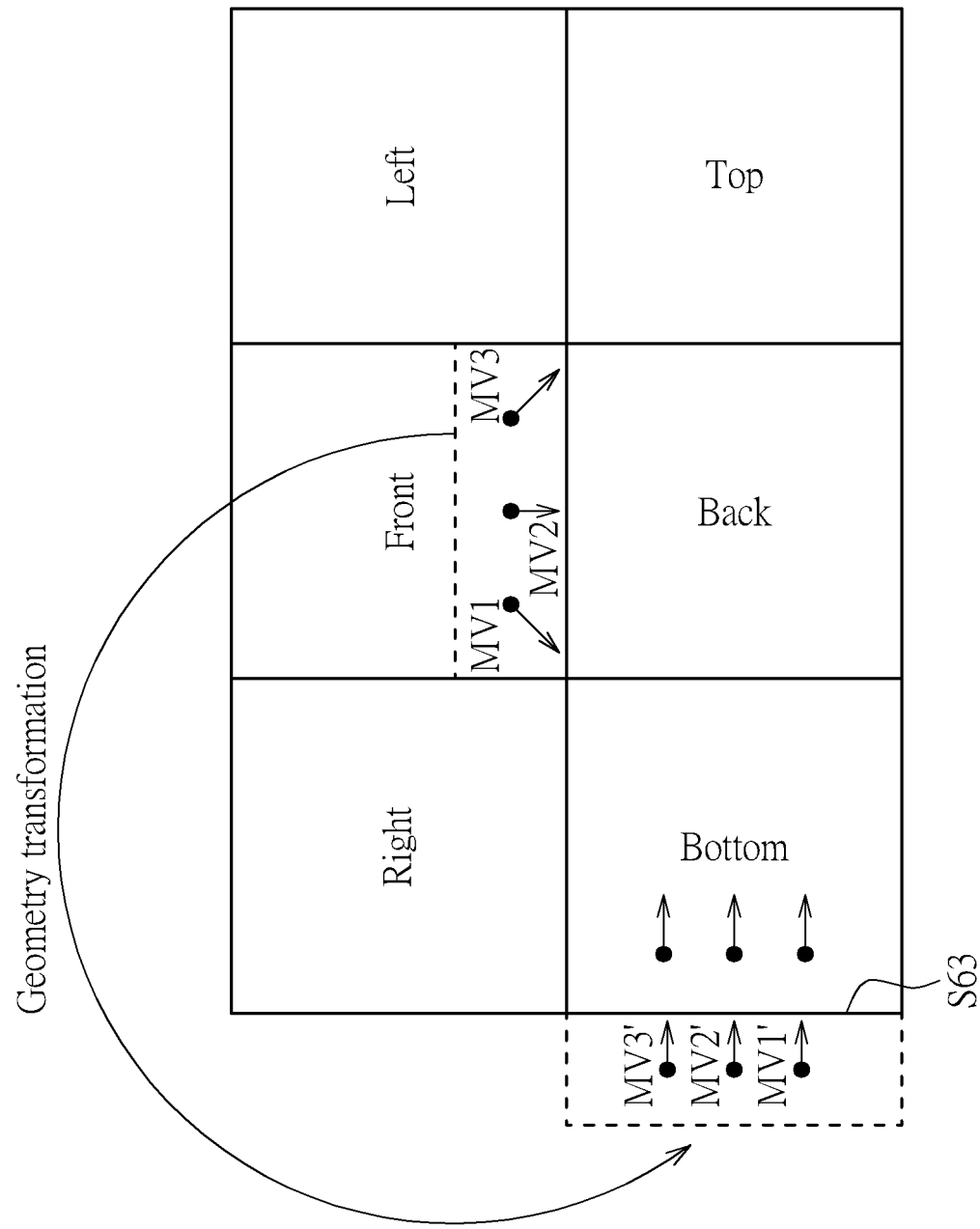
FIG. 15 is a diagram illustrating a second motion vector adjustment scheme according to an embodiment of the present invention.

FIG. 15 is a diagram illustrating a second motion vector adjustment scheme according to an embodiment of the present invention. When a de-blocking filtering process is applied to blocks that are included in the square projection face "Bottom" and have block edges located on the face boundary S63, spherical neighboring blocks are found in the square projection face "Front". As shown in FIG. 15, the spherical neighboring blocks are obtained from blocks included in the square projection face "Front", where one block has a motion vector MV1, another block has a motion vector MV2, and yet another block has a motion vector MV3. Hence, an original motion vector of one spherical neighboring block is MV1, an original motion vector of another spherical neighboring block is MV2, and an original motion vector of yet another spherical neighboring block is MV3. A motion vector MV can be adjusted by a geometry transformation function GT. Hence, an adjusted motion vector MV' is obtained from the motion vector MV and the geometry transformation function GT, that is, MV'=GT (MV). In this example, an adjusted motion vector MV1' of one spherical neighboring block is obtained by applying geometry transformation to the original motion vector MV1, an adjusted motion vector MV2' of another spherical neighboring block is obtained by applying geometry transformation to the original motion vector MV2, and an adjusted motion vector MV3' of yet another spherical neighboring block is obtained by applying geometry transformation to the original motion vector MV3.

Figure 16:
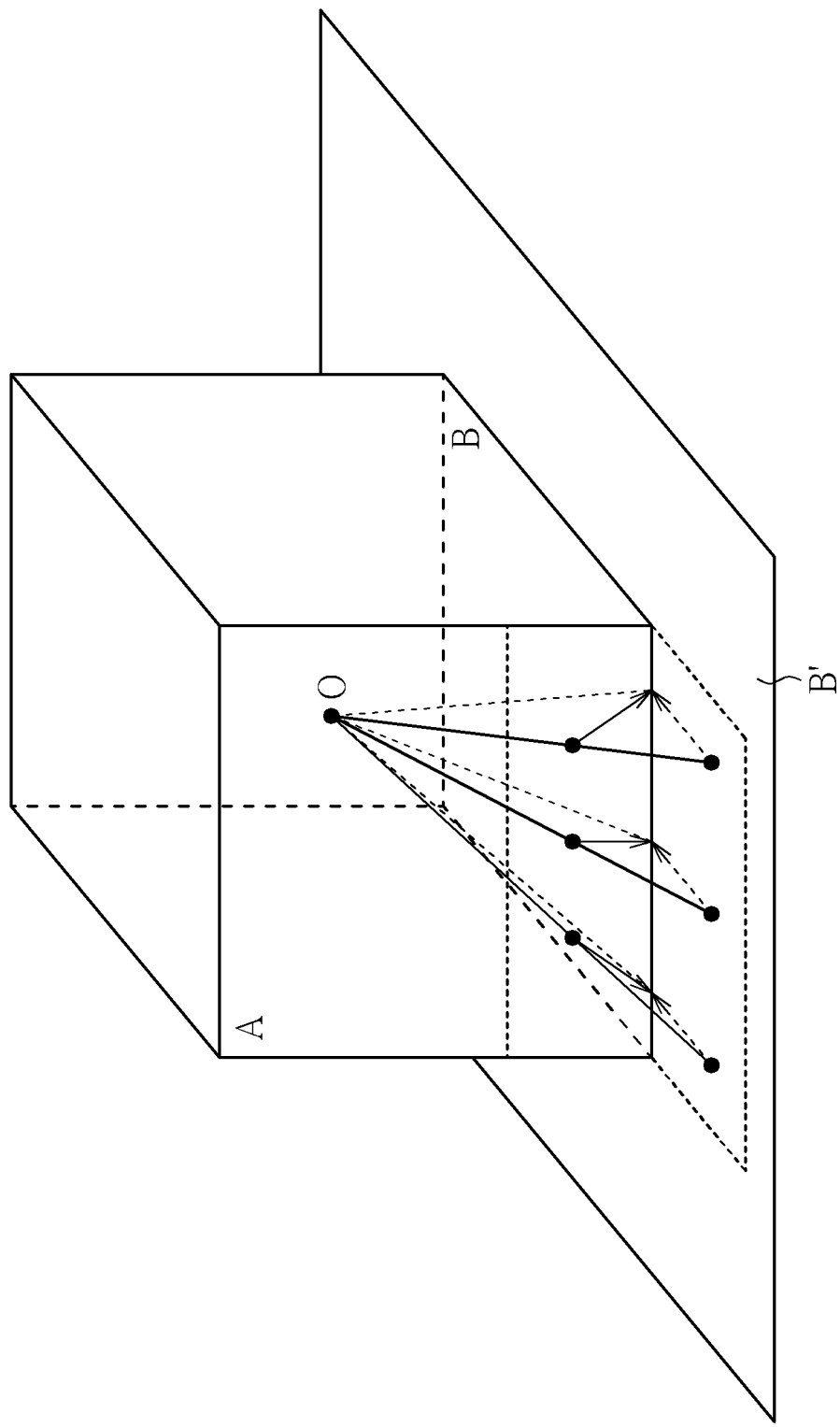
FIG. 16 is a diagram illustrating an adjusted motion vector found by geometry transformation according to an embodiment of the present invention.

FIG. 16 is a diagram illustrating an adjusted motion vector found by geometry transformation according to an embodiment of the present invention. A current block to be de-blocking filtered is located at a face B (e.g., bottom face of cube 201). To determine an adjusted motion vector of a spherical neighboring block, geometry transformation is applied to an original motion vector of the spherical neighboring block found in a face A (e.g., front face of cube 201) to project the original motion vector of the spherical neighboring block from face A to an extended area B' of the face B. The point O represents a projection center (e.g., a center of the sphere 200). A projected motion vector on the extended area B' of the face B is used as the adjusted motion vector of a spherical neighboring block. In FIG. 16, an original motion vector of the spherical neighboring block is represented by a solid line arrow symbol, and an adjusted motion vector of the spherical neighboring block is represented by a broken line arrow symbol. In this way, the adjusted motion vectors MV1'-MV3' shown in FIG. 1 can be obtained from applying geometry transformation to original motion vectors MV1-MV3, respectively.

After an adjusted motion vector is generated at step 1314, the adjusted motion vector is involved in determination of the boundary strength (Bs). At step 1316, the boundary strength of the block edge is calculated. As mentioned above, the boundary strength of the block edge represents the degree of discontinuity of two adjacent blocks. The value of boundary strength depends on properties of the current block and the neighboring block. For example, the aforementioned conditions can be checked to set the value of boundary strength, where the adjusted motion vector of the spherical neighboring block is used by the boundary strength determination.

The de-blocking filter 134/144 may include a luma filter and a chroma filter. When Bs=2, the luma filter is on, and the chroma filter is on. When Bs=1, the luma filter is on, and the chroma filter is off. When Bs=0, the luma filter is off, and the chroma filter is off. At step 1318, one or both of the luma filter and the chroma filter are enabled due to Bs≥1 or Bs≥2. At step 1320, none of the luma filter and the chroma filter is enabled due to Bs=0.

A spherical neighboring block (which is required by a de-blocking filtering process of the current block) is stored into the block buffer 140/150 by copying a block found in a square projection face packed in the reconstructed projection-based frame R/R' and then properly rotating the copied block. At step 1322, inverse rotation is applied to the spherical neighboring block stored in the block buffer 140/150, and the source block in the square projection face packed in the reconstructed projection-based frame R/R' is replaced/overwritten by the inversely rotated spherical neighboring block. In a case where pixels on both sides of a block edge are updated by a luma filter of the de-blocking filter 140/150 due to Bs≠0 or updated by a chroma filter of the de-blocking filter 140/150 due to BS>1, pixels of the spherical neighboring block in the block buffer 140/150 are updated and then written back to replace source pixels in the square projection face packed in the reconstructed projection-based frame R/R'.

In accordance with the spherical neighbor based de-blocking method shown in FIG. 13, block edges inside the reconstructed projection-based frame R/R' but not on sub-frame boundaries may be filtered with their corresponding neighboring blocks on the 2D plane according to a processing flow that is the same as the traditional de-blocking filtering flow, and the block edges on sub-frame boundaries may be filtered with their corresponding spherical neighboring blocks (which may be found by the face based scheme or the geometry based scheme) according to a processing flow that is different from the traditional de-blocking filtering flow.

Figure 17:
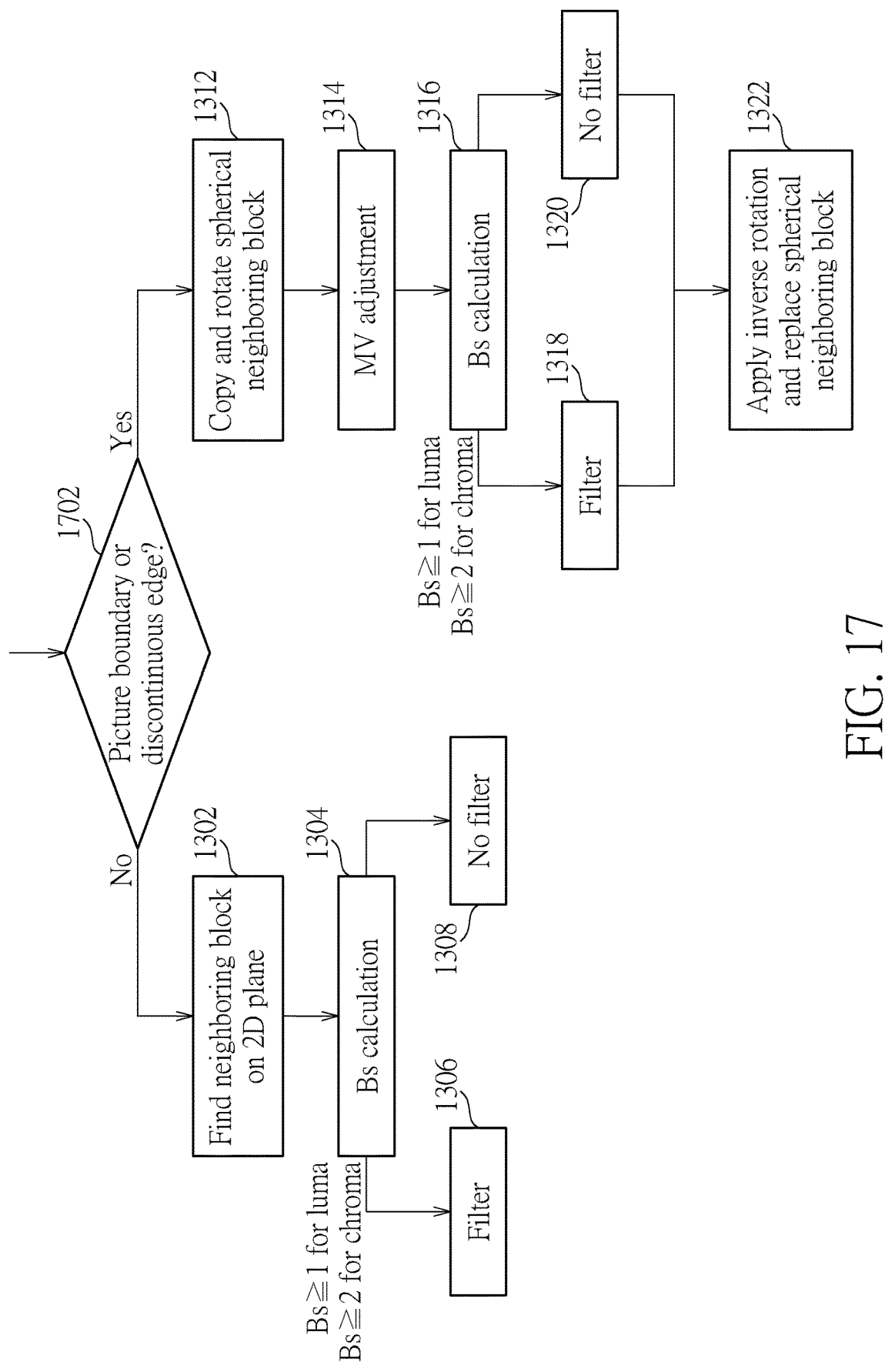
FIG. 17 is a flowchart illustrating a second spherical neighbor based de-blocking method according to an embodiment of the present invention.

FIG. 17 is a flowchart illustrating a second spherical neighbor based de-blocking method according to an embodiment of the present invention. The spherical neighbor based de-blocking method shown in FIG. 17 is derived from combining processing flows shown in FIG. 13 through an additional step 1702. The block edges include in the reconstructed projection-based frame R/R' are processed one by one. Hence, step 1702 checks if a block edge is located on the picture boundary of the reconstructed projection-based frame R/R' or located on the discontinuous edge between the top sub-frame and the bottom frame of the reconstructed projection-based frame R/R'. That is, step 1702 checks if the block edge is located on one of the sub-frame boundaries. When the block edge is not located on any sub-frame boundary, the flow proceeds with step 1302, such that the same processing flow shown in the sub-diagram (a) of FIG. 13 is performed upon the current block edge. When the block edge is located on a sub-frame boundary, the flow proceeds with step 1312. Hence, the same processing flow shown in the sub-diagram (b) of FIG. 13 is performed upon the current block edge.

Figure 18:
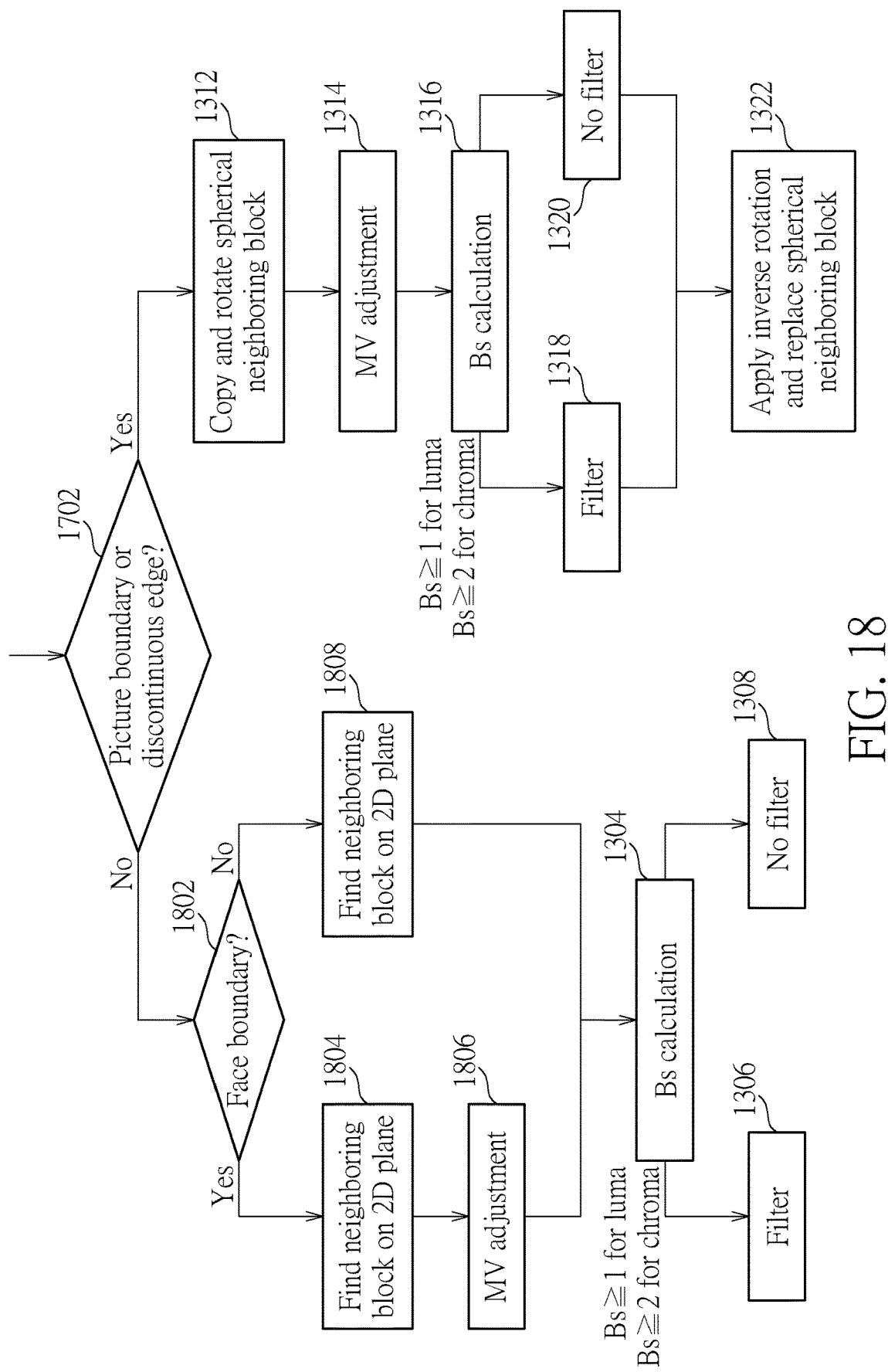
FIG. 18 is a flowchart illustrating a third spherical neighbor based de-blocking method according to an embodiment of the present invention.

FIG. 18 is a flowchart illustrating a third spherical neighbor based de-blocking method according to an embodiment of the present invention. The block edges include in the reconstructed projection-based frame R/R' are processed one by one. When the block edge is located on a sub-frame boundary, the flow proceeds with step 1312. Hence, the same processing flow shown in the sub-diagram (b) of FIG. 13 is performed upon the current block edge.

When a block edge is not on a sub-frame boundary and is not on a face boundary (steps 1702 and 1802), a neighboring block is found on the 2D plane (step 1808). Next, the value of boundary strength (Bs) is calculated for the block edge (step 1304).

When square projection faces "Right", "Front", "Left", "Bottom", "Back", and "Top" are packed in the compact CMP layout 204 shown in FIG. 2, there is image content continuity between face boundaries S14 and S22, there is image content continuity between face boundaries S24 and S32, there is image content continuity between face boundaries S61 and S53, and there is image content continuity between face boundaries S51 and S43. When a block edge is not on a sub-frame boundary but is on a face boundary (steps 1702 and 1802), it means the block edge is on one of the face boundaries S14, S22, S61, S53, S24, S32, S51, S43. At step 1804, a neighboring block is found on the 2D plane. It should be noted that the neighboring block found on the 2D plane is a spherical neighboring block due to the fact that there is image content continuity between the current block and the neighboring block on the 2D plane. That is, a spherical neighboring block found by the aforementioned face based scheme is the same as a neighboring block found on the 2D plane. At step 1806, the aforementioned motion vector adjustment is performed to adjust a motion vector of the neighboring block. An adjusted motion vector of the neighboring block is involved in determination of the boundary strength (Bs) of the block edge at step 1304.

In accordance with the spherical neighbor based de-blocking method shown in FIG. 18, the block edges inside the reconstructed projection-based frame R/R' but not on face boundaries may be filtered with their corresponding neighboring blocks on the 2D plane according to a processing flow that is the same as the traditional de-blocking filtering flow, and the block edges on face boundaries may be filtered with their corresponding spherical neighboring blocks according to a processing flow that is different from the traditional de-blocking filtering flow.

Figure 19:
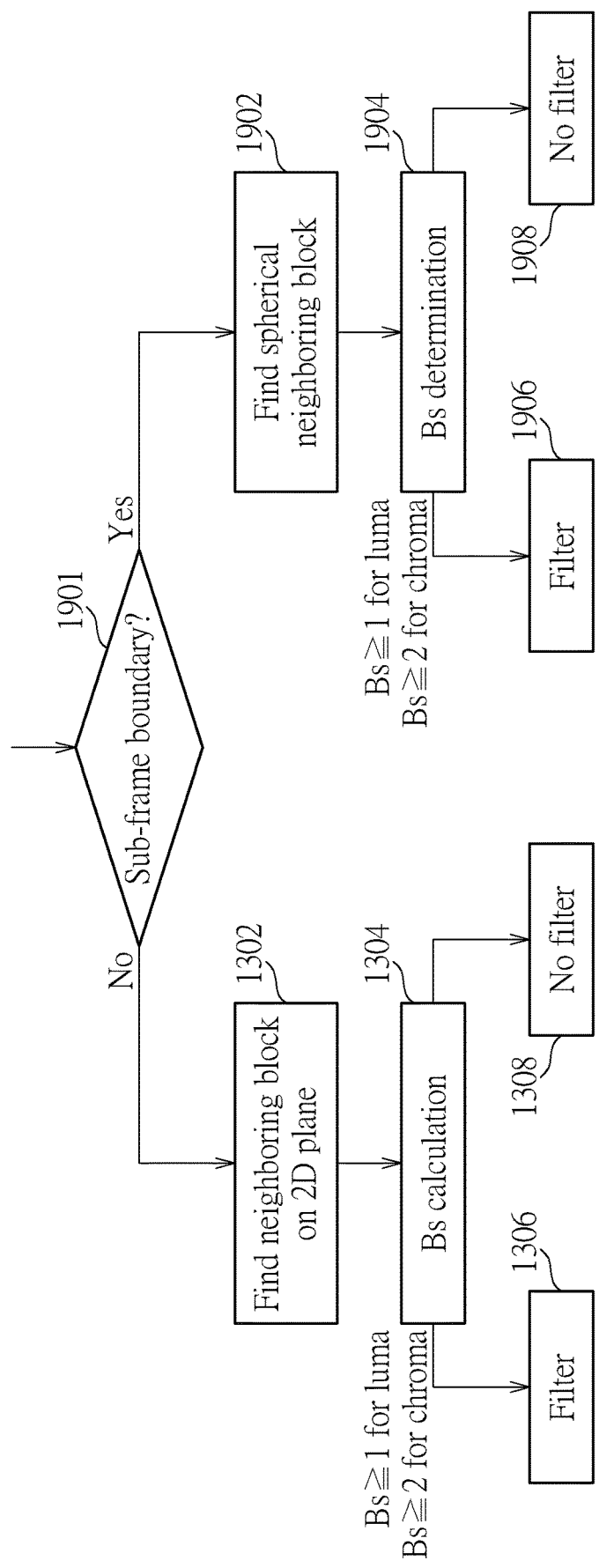
FIG. 19 is a flowchart illustrating a fourth spherical neighbor based de-blocking method according to an embodiment of the present invention.

FIG. 19 is a flowchart illustrating a fourth spherical neighbor based de-blocking method according to an embodiment of the present invention. The block edges include in the reconstructed projection-based frame R/R' are processed one by one. Step 1901 checks if a block edge is located on the picture boundary of the reconstructed projection-based frame R/R' or located on the discontinuous edge between the top sub-frame and the bottom sub-frame of the reconstructed projection-based frame R/R'. That is, step 1901 checks if the block edge is located on a sub-frame boundary. When the block edge is not located on any sub-frame boundary, the flow proceeds with step 1302. Hence, the same processing flow shown in the sub-diagram (a) of FIG. 13 is performed upon the block edge.

When the block edge is located on one of the sub-frame boundaries, the flow proceeds with step 1902. In this embodiment, a spherical neighboring block is found by one of the face based scheme and the geometry based scheme in an on-the-fly manner, and pixels in the spherical neighboring block are found and loaded dynamically when needed (step 1902). At step 1904, a modified boundary strength (Bs) determination process is performed. For example, the modified boundary strength determination process may include applying the aforementioned motion vector adjustment to an original motion vector of the spherical neighboring block for generating an adjusted motion vector that is involved in determination of the boundary strength, and/or directly setting the value of boundary strength by a pre-defined constant value regardless of properties of the spherical neighboring block. For example, the boundary strength of all block edges located on the sub-frame boundaries is set by the same pre-defined constant value '1'. For another example, the boundary strength of all block edges located on the sub-frame boundaries is set by the same pre-defined constant value '2'. For yet another example, the boundary strength of all 'intra' block edges located on the sub-frame boundaries is set by the same pre-defined constant value '2', and the boundary strength of all 'inter' block edges located on the sub-frame boundaries is set by the same pre-defined constant value '1'. At step 1906, one or both of the luma filter and the chroma filter are enabled due to Bs≥1 or Bs≥2. At step 1908, none of the luma filter and the chroma filter is enabled due to Bs=0.

When a spherical neighboring block of a current block is found by the geometry based scheme, the filtered spherical neighboring pixels included in the spherical neighboring block may be directly discarded after the filtering process. Alternatively, the filtered spherical neighboring pixels included in the spherical neighboring block may be blended with pixels of a block in the reconstructed projection-based frame R/R' to update the pixels of the block in the reconstructed projection-based frame R/R'. Hence, the de-blocking filter 134/144 may be further arranged to deal with blending after de-blocking.

Figure 20:
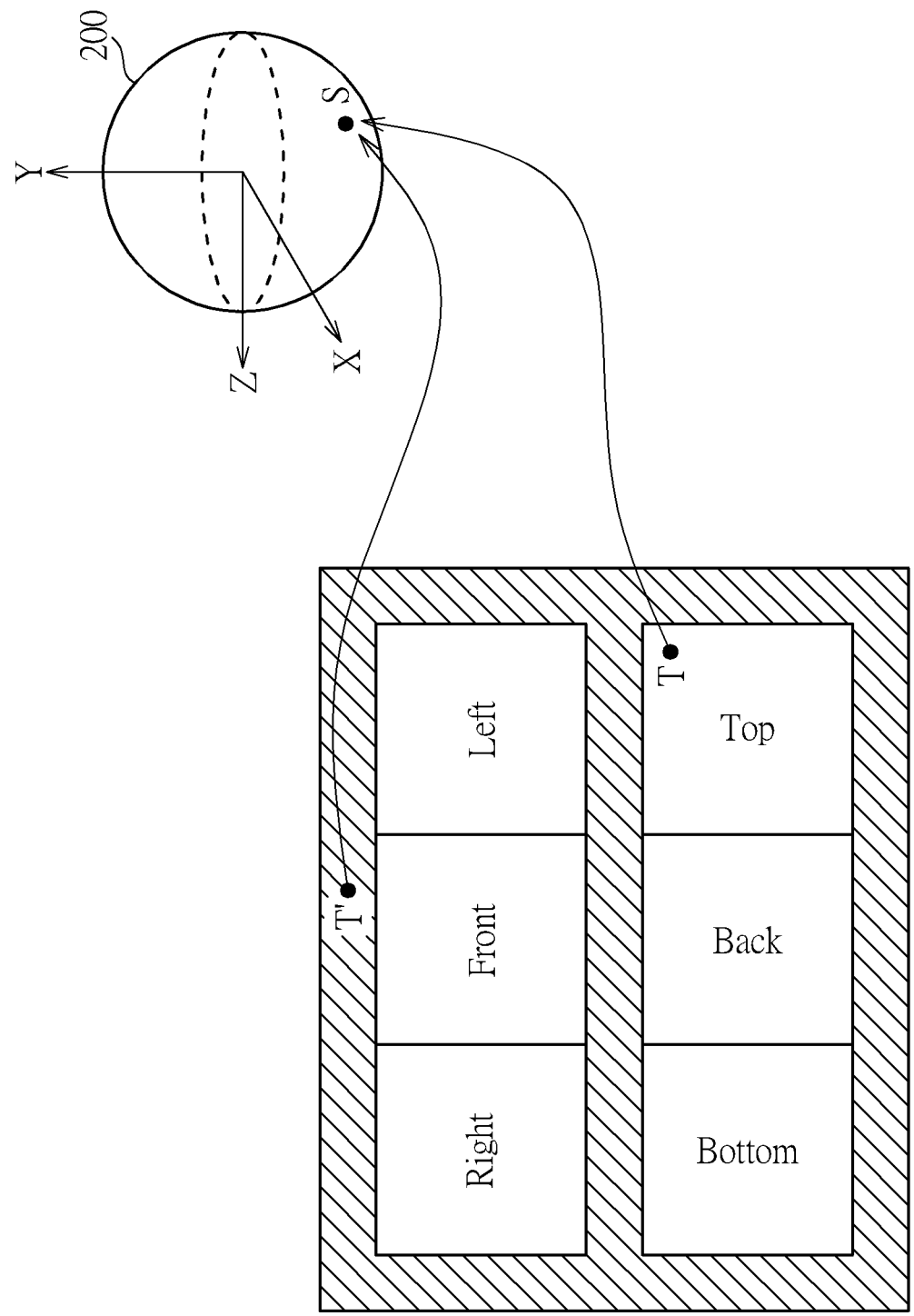
FIG. 20 is a diagram illustrating a blending process according to an embodiment of the present invention.

FIG. 20 is a diagram illustrating a blending process according to an embodiment of the present invention. A spherical neighboring pixel T' included in a spherical neighboring block found by the geometry based scheme and a pixel T of a block included in the square projection face "Top" packed in the reconstructed projection-based frame R/R' are mapped to the same point S on the sphere 200. After de-blocking filtering of a top block edge of a block in the square projection face "Front" is done, the pixel value q of the spherical neighboring pixel T' is used to update the pixel value p of the pixel T by a blending function p'=p*w+q*(1−w), where p' represents the updated pixel value of the pixel T, and w represents a weighting value between [0, 1].

In above embodiments, the proposed spherical neighbor based de-blocking method is employed by the de-blocking filter 134/144 to control de-blocking filtering of block edges located on sub-frame boundaries (or face boundaries) of the reconstructed projection-based frame R/R' with projection faces packed in a cube-based projection layout (e.g., compact CMP layout 204). However, this is for illustrative purposes only, and is not meant to be a limitation of the present invention. Alternatively, the proposed spherical neighbor based de-blocking method may be employed by the de-blocking filter 134/144 to control de-blocking filtering of block edges located on picture boundaries of the reconstructed projection-based frame R/R' and/or discontinuous face edges (i.e., discontinuous face boundaries) inside the reconstructed projection-based frame R/R' with projection faces packed in a different projection layout. For example, the 360 VR projection layout L_VR may be an equirectangular projection (ERP) layout, a padded equirectangular projection (PERP) layout, an octahedron projection layout, an icosahedron projection layout, a truncated square pyramid (TSP) layout, a segmented sphere projection (SSP) layout, or a rotated sphere projection layout.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A de-blocking method for a reconstructed projection-based frame that comprises a plurality of projection faces packed in a projection layout of a 360-degree Virtual Reality (360 VR) projection from which a 360-degree image content of a sphere is mapped onto the projection faces, comprising:
   obtaining, by a de-blocking filter, a first spherical neighboring block for a first block with a block edge to be de-blocking filtered; and
   selectively applying de-blocking to the block edge of the first block for at least updating a portion of pixels of the first block;
   wherein the projection faces comprise a first projection face and a second projection face, one face boundary of the first projection face connects with one face boundary of the second projection face, there is image content discontinuity between said one face boundary of the first projection face and said one face boundary of the second projection face, the first block is a part of the first projection face, the block edge of the first block is a part of said one face boundary of the first projection face, and a region on the sphere to which the first spherical neighboring block corresponds is adjacent to a region on the sphere from which the first projection face is obtained.

2. The de-blocking method of claim 1, wherein obtaining the first spherical neighboring block comprises:
   directly using pixels selected from one of the projection faces to act as spherical neighboring pixels included in the first spherical neighboring block.

3. The de-blocking method of claim 2, wherein a second block is a part of said one of the projection faces, the pixels used for setting the spherical neighboring pixels are included in the second block, and the de-blocking method further comprises:
   skipping de-blocking of a block edge of the second block in response to a condition that said de-blocking has been applied to the block edge of the first block, wherein the block edge of the first block and the block edge of the second block are a same block edge.

4. The de-blocking method of claim 2, wherein directly using pixels selected from one of the projection faces to act as the spherical neighboring pixels comprises:
   setting a first parameter that is indicative of a position of a pixel which is included in said one of the projection faces, located at a first filter line, and closest to the block edge to be de-blocking filtered;
   setting a second parameter that is indicative of a first offset value used to find a next pixel in a filter line;
   setting a third parameter that is indicative of a second offset value used to find a next filter line; and
   dynamically reading each of the spherical neighboring pixels from said one of the projection faces according to the first parameter, the second parameter, and the third parameter.

5. The de-blocking method of claim 1, wherein obtaining the first spherical neighboring block comprises:
   applying geometry mapping to projected pixels on an extended area of the first projection face to find points on one of the projection faces; and
   deriving spherical neighboring pixels included in the first spherical neighboring block from the points.

6. The de-blocking method of claim 5, wherein the first spherical neighboring block is dynamically found during a process of selectively applying said de-blocking to the block edge of the first block.

7. The de-blocking method of claim 5, wherein selectively applying de-blocking to the block edge of the first block comprises:
   applying de-blocking to the block edge of the first block in response to a boundary strength of the block edge of the first block, comprising:
      updating a portion of spherical neighboring pixels included in the first spherical neighboring block to generate filtered spherical neighboring pixels; and
   the de-blocking method further comprises:
      generating an updated pixel value of a first pixel by blending a pixel value obtained for the first pixel and a pixel value obtained for a second pixel, wherein the first pixel is located at a position included in one of the projection faces, the second pixel is one of the filtered spherical neighboring pixels, and the first pixel and the second pixel are mapped to a same point on the sphere.

8. The de-blocking method of claim 1, wherein the first spherical neighboring block is an inter block with a motion vector, and selectively applying de-blocking to the block edge of the first block comprises:
adjusting an original motion vector of the first spherical neighboring block to generate an adjusted motion vector for the first spherical neighboring block;
determining a boundary strength of the block edge of the first block, wherein the adjusted motion vector is involved in determination of the boundary strength; and
selectively applying de-blocking to the block edge of the first block according to the boundary strength.

9. The de-blocking method of claim 8, wherein adjusting the original motion vector of the first spherical neighboring block to generate the adjusted motion vector comprises:
determining a rotation angle according to frame packing information of the projection layout; and
rotating the original motion vector by the rotation angle to generate the adjusted motion vector.

10. The de-blocking method of claim 8, wherein adjusting the original motion vector of the first spherical neighboring block to generate the adjusted motion vector comprises:
applying geometry transformation to the original motion vector of the first spherical neighboring block in one of the projection faces for determining a projected motion vector on an extended area of the first projection face, wherein the projected motion vector is used as the adjusted motion vector.

11. The de-blocking method of claim 1, wherein selectively applying de-blocking to the block edge of the first block comprises:
directly setting a boundary strength of the block edge of the first block by a pre-defined constant value, regardless of properties of the first spherical neighboring block; and
selectively applying de-blocking to the block edge of the first block according to the boundary strength.

12. The de-blocking method of claim 1, further comprising:
obtaining a second spherical neighboring block for a second block with a block edge to be de-blocking filtered; and
selectively applying de-blocking to the block edge of the second block for at least updating a portion of pixels of the second block;
wherein the second block is a part of one of projection faces, the block edge of the second block is a part of a picture boundary of the reconstructed projection-based frame, and a region on the sphere to which the second spherical neighboring block corresponds is adjacent to a region on the sphere from which said one of projection faces is obtained.

13. The de-blocking method of claim 1, further comprising:
obtaining a neighboring block for a second block with a block edge to be de-blocking filtered, wherein the projection faces further comprise a third projection face, another face boundary of the first projection face connects with one face boundary of the third projection face, there is image content continuity between said another face boundary of the first projection face and said one face boundary of the third projection, the second block is a part of the first projection face, and the block edge of the second block is a part of said another face boundary of the first projection face;
adjusting an original motion vector of the neighboring block that is an inter block to generate an adjusted motion vector for the neighboring block;
determining a boundary strength of the block edge of the second block, wherein the adjusted motion vector is involved in determination of the boundary strength; and
selectively applying de-blocking to the block edge of the second block according to the boundary strength.

14. The de-blocking method of claim 13, wherein adjusting the original motion vector of the neighboring block to generate the adjusted motion vector for the neighboring block comprises:
applying geometry transformation to the original motion vector of the neighboring block in the third projection face for determining a projected motion vector on an extended area of the first projection face, wherein the projected motion vector is used as the adjusted motion vector.

15. The de-blocking method of claim 1, wherein selectively applying de-blocking to the block edge of the first block comprises:
when said one face boundary of the first projection face is a left face boundary, using a first-type filter process for controlling de-blocking of the block edge of the first block;
when said one face boundary of the first projection face is a top face boundary, using a second-type filter process for controlling de-blocking of the block edge of the first block;
when said one face boundary of the first projection face is a right face boundary, using a third-type filter process for controlling de-blocking of the block edge of the first block; and
when said one face boundary of the first projection face is a bottom face boundary, using a fourth-type filter process for controlling de-blocking of the block edge of the first block.

16. A de-blocking method for a reconstructed projection-based frame that comprises at least one projection face packed in a projection layout of a 360-degree Virtual Reality (360 VR) projection from which a 360-degree image content of a sphere is mapped onto said at least one projection face, comprising:
obtaining, by a de-blocking filter, a spherical neighboring block for a current block with a block edge to be de-blocking filtered; and
selectively applying de-blocking to the block edge of the current block for at least updating a portion of pixels of the current block;
wherein the current block is a part of one projection face packed in the reconstructed projection-based frame, the block edge of the current block is a part of a picture boundary of the reconstructed projection-based frame, and a region on the sphere to which the spherical neighboring block corresponds is adjacent to a region on the sphere from which said one projection face is obtained.

17. The de-blocking method of claim 16, wherein obtaining the spherical neighboring block comprises:
directly using pixels selected from said at least one projection face packed in the reconstructed projection-based frame to act as spherical neighboring pixels included in the spherical neighboring block.

18. The de-blocking method of claim 17, wherein another block is a part of said at least one projection face, the pixels used for setting the spherical neighboring pixels are included in said another block, and the de-blocking method further comprises:
    skipping de-blocking of a block edge of said another block in response to a condition that said de-blocking has been applied to the block edge of the current block, wherein the block edge of the current block and the block edge of said another block are a same block edge.

19. The de-blocking method of claim 17, wherein directly using pixels selected from said at least one projection face packed in the reconstructed projection-based frame to act as the spherical neighboring pixels comprises:
    setting a first parameter that is indicative of a position of a pixel which is included in said at least one projection face, located at a first filter line, and closest to the block edge to be de-blocking filtered;
    setting a second parameter that is indicative of a first offset value used to find a next pixel in a filter line;
    setting a third parameter that is indicative of a second offset value used to find a next filter line; and
    dynamically reading each of the spherical neighboring pixels from said at least one projection face according to the first parameter, the second parameter, and the third parameter.

20. The de-blocking method of claim 16, wherein obtaining the spherical neighboring block comprises:
    applying geometry mapping to projected pixels on an extended area of said one projection face to find points on said at least one projection face; and
    deriving spherical neighboring pixels included in the spherical neighboring block from the points.

21. The de-blocking method of claim 20, wherein the spherical neighboring block is dynamically found during a process of selectively applying said de-blocking to the block edge of the current block.

22. The de-blocking method of claim 20, wherein selectively applying de-blocking to the block edge of the current block comprises:
    applying de-blocking to the block edge of the current block in response to a boundary strength of the block edge of the current block, comprising:
        updating a portion of spherical neighboring pixels included in the spherical neighboring block to generate filtered spherical neighboring pixels; and the de-blocking method further comprises:
    generating an updated pixel value of a first pixel by blending a pixel value obtained for the first pixel and a pixel value obtained for a second pixel, wherein the first pixel is located at a position included in one projection face, the second pixel is one of the filtered spherical neighboring pixels, and the first pixel and the second pixel are mapped to a same point on the sphere.

23. The de-blocking method of claim 16, wherein selectively applying de-blocking to the block edge of the first block comprises:
    adjusting an original motion vector of the spherical neighboring block that is an inter block to generate an adjusted motion vector for the spherical neighboring block;
    determining a boundary strength of the block edge of the current block, wherein the adjusted motion vector is involved in determination of the boundary strength; and
    selectively applying de-blocking to the block edge of the current block according to the boundary strength.

24. The de-blocking method of claim 23, wherein adjusting the original motion vector of the spherical neighboring block to generate the adjusted motion vector comprises:
    determining a rotation angle according to frame packing information of the projection layout; and
    rotating the original motion vector by the rotation angle to generate the adjusted motion vector.

25. The de-blocking method of claim 23, wherein adjusting the original motion vector of the spherical neighboring block to generate the adjusted motion vector comprises:
    applying geometry transformation to the original motion vector of the spherical neighboring block in said at least one projection face for determining a projected motion vector on an extended area of said one projection face, wherein the projected motion vector is used as the adjusted motion vector.

26. The de-blocking method of claim 16, wherein selectively applying de-blocking to the block edge of the current block comprises:
    directly setting a boundary strength of the block edge of the current block by a pre-defined constant value, regardless of properties of the spherical neighboring block; and
    selectively applying de-blocking to the block edge of the current block according to the boundary strength.

* * * * *